United States Patent
Lyren

(10) Patent No.: US 9,691,107 B2
(45) Date of Patent: Jun. 27, 2017

(54) EXCHANGING PERSONAL INFORMATION TO DETERMINE A COMMON INTEREST

(71) Applicant: Philip Scott Lyren, Bangkok (TH)

(72) Inventor: Philip Scott Lyren, Bangkok (TH)

( * ) Notice: Subject to any disclaimer, the term of this patent is extended or adjusted under 35 U.S.C. 154(b) by 913 days.

(21) Appl. No.: 13/776,835

(22) Filed: Feb. 26, 2013

(65) Prior Publication Data

US 2014/0244744 A1    Aug. 28, 2014

(51) Int. Cl.
*G06F 15/16* (2006.01)
*G06Q 50/00* (2012.01)
*G06Q 10/10* (2012.01)

(52) U.S. Cl.
CPC ........... *G06Q 50/01* (2013.01); *G06Q 10/109* (2013.01)

(58) Field of Classification Search
CPC .............................. G06Q 50/01; G06Q 10/109
See application file for complete search history.

(56) References Cited

U.S. PATENT DOCUMENTS

| | | | | |
|---|---|---|---|---|
| 2004/0046656 A1* | 3/2004 | Schaefer | ................. | G08B 1/08 340/539.11 |
| 2010/0036912 A1* | 2/2010 | Rao | ..................... | H04L 12/5865 709/204 |
| 2010/0153175 A1* | 6/2010 | Pearson | ................. | G06Q 10/10 705/319 |
| 2013/0104080 A1* | 4/2013 | Bosworth | .............. | G06Q 10/10 715/838 |
| 2013/0132476 A1* | 5/2013 | Shaffer | ................. | G06Q 50/01 709/204 |
| 2013/0316735 A1* | 11/2013 | Li | ........................... | H04W 4/02 455/456.3 |
| 2014/0222908 A1* | 8/2014 | Park | ....................... | G06Q 10/10 709/204 |

* cited by examiner

*Primary Examiner* — Cheikh Ndiaye
*Assistant Examiner* — Jaren M Means

(57) ABSTRACT

A user agent of a user selects another user having a user agent. The user agents exchange personal information about the user and personal information about the other user. The user agent determines whether a common interest exists between the two users based on the exchange of personal information. The other user is added to a social networking webpage of the user when the user agent determines that a common interest exists.

18 Claims, 11 Drawing Sheets

```
                    Common Interest Settings        1210
                                           1220
    ☐ Attend Same High School
    ☐ Attend Same University
    ☐ Born same city  ☐ county  ☐ state  ☐ country
    ☐ Has gender of   ☐ male   ☐ female
    ☐ Has occupation of  ☐ doctor  ☐ lawyer
    ☐ Has age of ☐ 15-20 ☐ 21-25 ...☐ any age
    ☐ Has status as ☐ married ☐ single ☐ any
    ☐ Has proximity of ☐ 10 yards ☐ 50 yards ☐ any
    ☐ Has interest of ☐ music ☐ dance ☐ singing
    ☐ Has sports interest of ☐ biking ☐ baseball
```
1200

Figure 12

```
       1320              Privacy Settings       1300      1310

Photo exchange      ☐ always ☐ never ☐ if other user provides
    Name exchange       ☐ always ☐ never ☐ if other user provides
    Location exchange   ☐ always ☐ never ☐ if other user provides
    Phone # exchange    ☐ always ☐ never ☐ if other user provides
    Travel exchange     ☐ always ☐ never ☐ if other user provides
    Health exchange     ☐ always ☐ never ☐ if other user provides
    Job exchange        ☐ always ☐ never ☐ if other user provides
    Family exchange     ☐ always ☐ never ☐ if other user provides
    Finance exchange    ☐ always ☐ never ☐ if other user provides Authorize User Agent to communicate with individuals
    on your behalf      ☐ always ☐ never ☐ if other user provides
```

Figure 13

EXCHANGING PERSONAL INFORMATION TO DETERMINE A COMMON INTEREST

BACKGROUND

Electronic social networks enable users to communicate and share information with other users of the social network, such as family members, friends, and business contacts. In order to build, personalize, and maintain a user space in the social network, users interact with a computer to enter personal information, upload photos, search and communicate with friends, and perform a multitude of other tasks. Entering such information and interfacing with the social network can be labor intensive and time-consuming for the users.

BRIEF DESCRIPTION OF THE DRAWINGS

FIG. 12 is an electronic device with a display that shows examples of common interest settings in accordance with an example embodiment.

FIG. 13 is an electronic device with a display that shows examples of privacy settings in accordance with an example embodiment.

SUMMARY OF THE INVENTION

One example embodiment is a method in which a first user agent of a first user selects, without knowledge of and instruction from the first user, an electronic device of a second user having a second user agent. The first and second user agents exchange personal information about their users. The first user agent determines whether a common interest exists between the first user and the second user based on the exchange of personal information. The second user is added to a social networking webpage of the first user based on the determining by the first user agent that the common interest exists.

DETAILED DESCRIPTION

Example embodiments include systems, apparatus, and methods that exchange personal information to determine a common interest between users.

Figure 1:
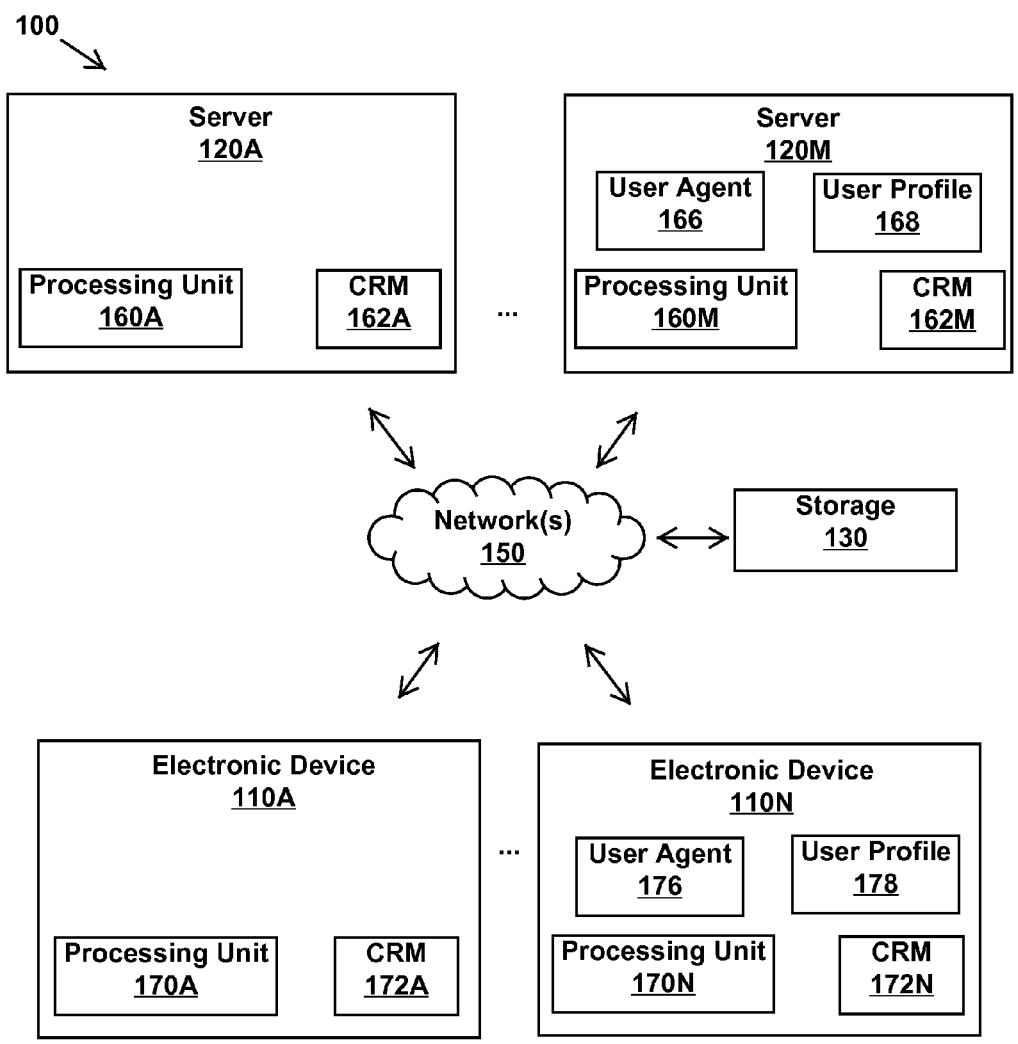
FIG. 1 is a computer system in accordance with an example embodiment.

FIG. 1 is a computer system 100 in accordance with an example embodiment. The computer system includes a plurality of electronic devices 110A to 110N, a plurality of servers 120A to 120M, and storage 130 in communication with each other through one or more networks 150. The electronic devices, servers, and storage communicate through the networks to execute blocks and methods discussed herein. Blocks and methods discussed herein are executed with the computer system or one or more of the electronic devices and servers.

The servers 120A to 120M include a processor unit with one or more processors and computer readable medium (CRM), such as random access memory and/or read only memory. Server 120A includes processor unit 160A and CRM 162A, and server 120M includes processor unit 160M and CRM 162M. The processing unit communicates with the CRM to execute operations and tasks that implement or assist in implementing example embodiments. One or more of the servers can also include a user agent and user profile, such server 120M including user agent 166 and user profile 168.

The electronic devices 110A to 110N include a processor unit with one or more processors and computer readable medium (CRM), such as random access memory and/or read only memory. Electronic device 110A includes processor unit 170A and CRM 172A, and electronic device 110N includes processor unit 170N and CRM 172N. The processing unit communicates with the CRM to execute operations and tasks that implement or assist in implementing example embodiments. One or more of the electronic devices can also include a user agent and a user profile, such as electronic device 110A including user agent 176 and user profile 178.

By way of example, the electronic devices 110A to 110N include, but are not limited to, handheld and/or portable computing devices, electronic devices with cellular or mobile phone capabilities, digital cameras, desktop computers, servers, portable computers (such as tablet and notebook computers), handheld audio playing devices (example, handheld devices for downloading and playing music and videos), personal digital assistants (PDAs), combinations of these devices, and other portable and non-portable electronic devices and systems. An example of an electronic device and/or server also appears in FIG. 14.

By way of example, the networks 150 can include one or more of the internet, an intranet, an extranet, a cellular network, a local area network (LAN), a home area network (HAN), metropolitan area network (MAN), a wide area network (WAN), public and private networks, etc.

By way of example, the storage 130 can include various types of storage that include, but are not limited to magnetic storage and optical storage, such as hard disks, magnetic tape, disk cartridges, universal serial bus (USB) flash memory, compact disk read-only memory (CD-ROM), digital video disk read-only memory (DVD-ROM), CD-recordable memory, CD-rewritable memory, photoCD, and web-based storage. Storage can include storage pools that are hosted by third parties, such as an operator of a data center. The electronic devices and/or servers can use the storage to store files, software applications, data objects, etc. Storage can be accessed through a web service application programming interface, a web-based user interface, or other mechanisms.

Figure 2:
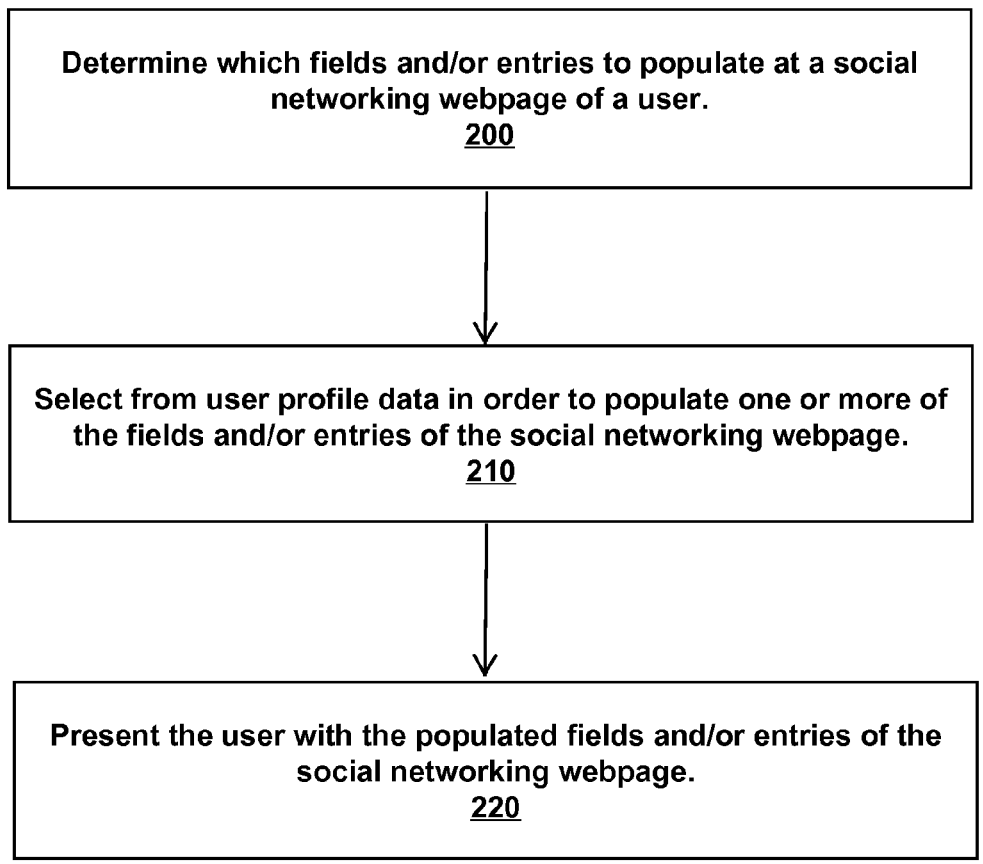
FIG. 2 is a method to populate a social networking webpage of a user in accordance with an example embodiment.

FIG. 2 is a method to populate a social networking webpage of a user in accordance with an example embodiment.

According to block 200, a determination is made as to which fields and/or entries to populate at a social networking webpage of a user. This determination can be made by the user, an electronic device, and/or a user agent of the user. Fields and/or entries to populate include, but are not limited to, user space at a social network, information presented and/or displayed at webpages, memory allocated and/or provided to a user at the social network, and fields and/or entries that are blank or empty, include information already, are required to include information, are periodically or continually or continuously updated, and are newly created.

Social networking websites can have different fields and/or entries that depend on the type of social network. For instance, a social networking website catering to professional networking and career building has different fields to populate from a social networking website catering to photograph sharing among members.

Example fields and/or entries include, but are not limited to, information about the user (such as sports, employment information, hobbies, interest, demographics, geographical location of the user, etc.), photographs of the user, social profile data, videos, personal preferences of the user, memberships, friends of the user, family of the user, general account information (such as name, username, login password, email, language, etc.), privacy settings (such as what information is public and/or private, who can search and see user information, who can search and see user posts, etc.), posts to the social networking website, emails, security information (such as security questions and answers, login notifications, application passwords, recognized electronic devices, etc.), payment information (such as credit card information), etc. For example, demographic fields can include one or more of age, gender, race, ethnicity, mobility, home ownership, marital status, employment status, disabilities, income level, etc. As another example, photographs can include a profile picture, cover photographs, photographs of family, vacation photographs, etc.

According to block 210, information is selected from user profile data in order to populate one or more of the fields and/or entries of the social networking webpage. This selection can be made by the user, an electronic device, and/or a user agent of the user. User profile data is provided, captured, generated, received, retrieved, uploaded, and/or transmitted to complete one or more of the fields and/or entries.

According to block 220, the populated fields and/or entries of the social networking webpage are presented to the user. These fields and/or entries are provided to the user, such as being displayed to the user on a display of an electronic device, stored in memory, and/or transmitted over a network to the user and/or an electronic device.

In an example embodiment, the user is not required to spend time building or creating the social networking webpage, uploading personal data to the social networking webpage, filling or completing fields and/or entries, typing personal information into the webpage, etc. Instead, an electronic device and/or user agent automatically completes these tasks on behalf of the user. These tasks include executing one or more of blocks 200, 210, and 220 for the user.

Consider an example in which a user instructs his user agent to build and maintain personal information that is presented for others to view at a social networking webpage of the user. The user agent determines which fields to populate on behalf of the user and selects which personal information of the user will populate such fields. The user agent continually changes the personal information being presented at the social networking webpage as the user agent receives and/or creates new personal information about the user. When the user navigates to the website of the social networking webpage, one or more data fields and/or entries have already been automatically filled in and/or pre-populated by the user agent. These fields and/or entries are displayed to the user.

Consider an example in which a user decides to join a social networking website as a new user and instructs his user agent to complete this task for him. The user also instructs the user agent to build and/or design his webpage at the social networking website. In response to this request, the user agent navigates to the social networking website, creates and/or opens a new user account for the user, provides personal information requested by the social networking website, provides personal information to complete fields and/entries, selects pictures and videos of the user to upload (such as deciding which pictures of the user to upload and which pictures not to upload to the social networking website), and takes further steps to create and build the social networking website for the user (such as arranging a layout of the webpage, selecting colors, determining which information about the user to post and which information not to post, answering questions posed by the website, determining privacy settings, establishing a username and password, sending friend requests, etc.). After the social networking webpage is completed, the user agent notifies the user (such as sending a text message to the user stating as follows: "I created and built your social networking website per your request. Please login with the username and password provided below and review your webpage. Let me know if you have further changes."). The user reviews the social networking webpage and can approve the social networking webpage, delete information from the fields and/or entries, add information to the fields and/or entries, modify information in the fields and/or entries, and/or instruct the user agent to complete these tasks.

Consider another example in which a user pre-approves a social networking webpage before a user agent of the user completes building a new social networking webpage and/or commences building the social networking webpage. For example, the user believes that the user agent can accurately build the social networking webpage on behalf of the user according to the intentions and desires of the user and, hence, approves the social networking webpage before viewing it and/or before the webpage is even built.

Consider an example in which a user decides to join a social network, such as FACEBOOK. The user is not a member of this social networking website and desires to join as a new member. In order to join the social networking website, the user instructs a user agent to join the social networking website and setup the social networking webpages on behalf of the user. In response to this request, the user agent navigates to the website of FACEBOOK and completes steps to register and/or sign up the user as a new member. The user agent also creates and/or builds social networking webpages on behalf of the user and completes tasks that include providing profile information (such as providing personal information regarding previous and/or current place of employment, education (such as high school and universities attended), residence (such as home and business addresses), family information (such as number of brothers, sisters, sons, daughters, etc.), contact information (such as phone numbers, email address, address of personal website, etc.)), sends friend requests to family, friends, and/or business contacts (such as extracting names from a contact list of the user), uploading photos of the user and user's family and friends, selecting and uploading a cover photograph (such as selecting a favorite photograph from a plurality of photographs of the user), organizing a homepage of the user (such as designing a layout fields and/or entries that appear on the webpage of the user), providing information into a calendar (such as uploading dates of upcoming birthdates, anniversaries, holidays, vacations, and other events), completing account settings (such as providing name, address, telephone number, email address, password, username, etc.), completing privacy settings, creating advertisements, and engaging other members of the social networking webpage (such as providing posts, sending texts, uploading hyperlinks, sending requests for friends of the user to join the social network of the user, etc.).

Consider another example in which the user is already a member of a social network. The user instructs his handheld portable electronic device (HPED) to build, update, change, and/or maintain the existing social networking webpage on behalf of the user. In response to this request, the HPED executes these tasks on behalf of the user.

Information to build, to update, to change, and/or to maintain a social networking webpage of a user can be retrieved from electronic memory or storage, such as memory on an electronic device. By way of example, this information is obtained from and/or stored as user profile data.

In order to build, maintain, and/or update user profile data, one or more electronic devices monitor, collect, store, analyze, process, and/or transmit data with respect to the user and/or electronic devices, such as electronic devices that the user owns and/or electronic devices with which the user interfaces. By way of example, this data includes user behavior on an electronic device, installed client hardware, installed client software, locally stored client files, information obtained or generated from a user's interaction with a network (such as webpages on the internet), email, peripheral devices, servers, other electronic devices, programs that are executing, etc. The electronic devices collect user behavior on or with respect to an electronic device (such as the user's computer), information about the user, information about the user's computer, and/or information about the computer's and/or user's interaction with the network.

By way of example, a user profile builder monitors user activities and collects information used to create a user profile and/or gather personal information. The profile builder monitors the user's interactions with one or more electronic devices, the user's interactions with other software applications executing on electronic devices, activities performed by the user on external or peripheral electronic devices, etc. The profile builder collects both content information and context information for the monitored user activities and then stores this information. By way of further illustration, the content information includes contents of webpages accessed by the user, graphical information, audio/video information, uniform resource locators (URLs) visited, searches or queries performed by the user, items purchased over the internet, advertisements viewed or clicked, information on commercial or financial transactions, videos watched, music played, interactions between the user and a user interface of an electronic device, commands (such as voice and typed commands), hyperlinks clicked or selected, etc.

The user profile builder also gathers and stores information related to the context in which the user performed activities associated with an electronic device. By way of example, such context information includes, but is not limited to, an order in which the user accessed webpages (user's browser navigation), a frequency or number of times a user navigated to a web location, information regarding the user's response to interactive advertisements and solicitations, information about a length of time spent by the user on the webpages, information on the time when the user accessed the webpages, etc.

As previously stated, the user profile builder also collects content and context information associated with the user interactions with various different applications executing on one or more electronic devices. For example, the user profile builder monitors and gathers data on the user's interactions with a web browser, an electronic mail (email) application, a word processor application, a spreadsheet application, a database application, a cloud software application, and/or any other software application executing on an electronic device.

By way of illustration, the user profile builder collects content information for emails that include one or more of the recipient information, sender information, email subject title information, and the information related to the contents of the email including attachments. Context information for an email application may include the time when the user receives emails, time when the user sends emails, subject matter of the emails, frequency of the emails, recipients, etc.

Based on the user profile and/or data discussed in connection with the user profile, an electronic device and/or user agent can determine preferences of the user and make informed decisions and/or predictions on how to build, update, change, and/or maintain a website (such as a social networking webpage of the user). An analysis of one or more pieces of information included in the user profile occurs in order to make an intelligent prediction about how the user desires to build, update, change, and/or maintain personal information. For example, an intelligent and/or machine-learning user agent can emulate a personality of its user and make decisions on behalf of the user. The decisions made by the user agent emulate the decisions that would have been made by the user.

Consider an example in which a first user agent of a first user activates a camera on a HPED of the first user and takes a photograph of a second user. This photograph depicts the second user smiling and in a delightful mood. The first and second users are not even aware that the photograph was taken. The first user agent sends the photograph to a second user agent that is the user agent of the second user. For example, the first user agent transmits the photograph and a message to the second user agent as follows: "Hi. I just took this picture."). In previous instances, the second user has sent family and friends photographs that depict the second user in a joyous situation. The second user agent uses facial recognition to determine that the photograph is the second user and that the second user is smiling. This information and the previous instances of the second user sending similar photographs contribute to a determination that the second user likes this photograph and would want it posted to the internet. In response to this determination, the second user agent posts this photograph to the social networking webpage of the second user. This post can occur without express permission from, authorization from, or even knowledge of the first and/or second users (such as when the second user trusts a judgment of the second user agent to select and post photographs to the social networking webpage on behalf of the second user).

Consider another example in which a user takes a series of short videos while vacationing in Hawaii with a camera that automatically uploads the videos to a cloud storage location. The user reviews the videos, deletes some of them, and saves one video that shows the user's family swimming at the beach. An electronic device and/or user agent reviews the videos at the cloud storage location, determines that one of the videos was saved, and determines from a global positioning system (GPS) and events calendar that the user is on vacation in Hawaii. The electronic device and/or the user agent analyzes the saved video and determines that they show the user's family swimming at a beach in Hawaii. This information contributes to a determination that the user likes this video, and in response to this determination, the electronic device and/or the user agent automatically posts this video to the social networking webpage of the user with a caption (such as "Swimming with family while on vacation in Hawaii"). Thus, the social networking webpage of the user was updated without input and effort from the user. The user was not required to log into the social networking website, interact with a user interface (UI) and/or graphical user interface (GUI) to select and upload the video and type the caption. Instead, the electronic device and/or user agent performed these actions on behalf of the user.

Consider another example in which a user and friends go to Chinatown for dinner. During dinner, the user sends a text message or states during a phone call that the user is having a great dinner. An electronic device and/or user agent extracts and analyzes keywords from the text message or phone call to determine the actions of the user and the mood of the user. Information about the mood of the user can also be obtained from face-tracking applications (such as emotion-recognition software that recognizes facial emotions) and/or speech/voice analysis applications (such as voice recognition software that recognizes voice emotions). Based on an analysis of this information and a GPS location determination, the electronic device and/or user agent creates and composes a post that describes the event and/or emulates a post that the user would write about the event. The electronic device and/or user agent then provides the post to the Internet, (e.g., posting the post to the social networking webpage of the user). This post notes the location, activities, and mood of the user (such as "Having a great time eating dinner in Chinatown").

Consider another example in which a user receives a reminder from an event calendar stating that the user has an office Christmas party with co-workers this evening at 6:00 p.m. At 5:30 p.m. that evening, the user begins to drive toward the office to attend the party. An electronic device and/or user agent determines from GPS, the time of day, and the event calendar that the user is going to the office Christmas party. Based on this information, the electronic device and/or user agent updates the social networking webpage of the user (such as posting "Heading to Christmas party with co-workers. Happy holidays.").

Consider the example above in which the user is driving to the Christmas party. During the drive toward the office, the user gets a text message from a co-worker at the office party. The message asks the user what time he is coming to the party. The user cannot respond to the text message while driving or may not even be aware that such a text message was sent. The user agent reviews the text message and responds on behalf of the user (such as stating "I'm driving to the party now. See you soon.").

Information included in the user profile assists in making the determination about user preferences and assists in determining how to build, update, change, and/or maintain the social networking webpage of the user. For example, the user profile can include preferences that are obtained from previous and/or historic selections, UI events, GUI events, text messages, emails, phone calls, writings, etc. For instance, a record is maintained of previous websites visited, advertisements viewed, products purchased, locations visited, photographs and videos taken/saved/deleted, text messages sent and received, phone calls made and received, interactions with electronic devices, etc.

Other information included in the user profile can also assist in making the determination as to how to build, update, change, and/or maintain a website, a network location, a social networking webpage of the user, etc. For example, the user may prefer certain geographical locations (such as mountains, beach, desert, jungle, water, land, sky, etc.), prefer certain types of activities (such as sports or a certain leisure activities), or prefer certain affiliations (such as political, religious, scholastic, environmental, etc.).

One or more electronic devices and/or user agents determine, select, and/or control how to build, update, change, and/or maintain the social networking webpage of the user. This electronic device could be owned by the user (such as an HPED of the user) and/or an electronic device and/or user agent authorized by the user to make such a determination (such as a cloud or server in communication with an electronic device of the user).

Figure 3:
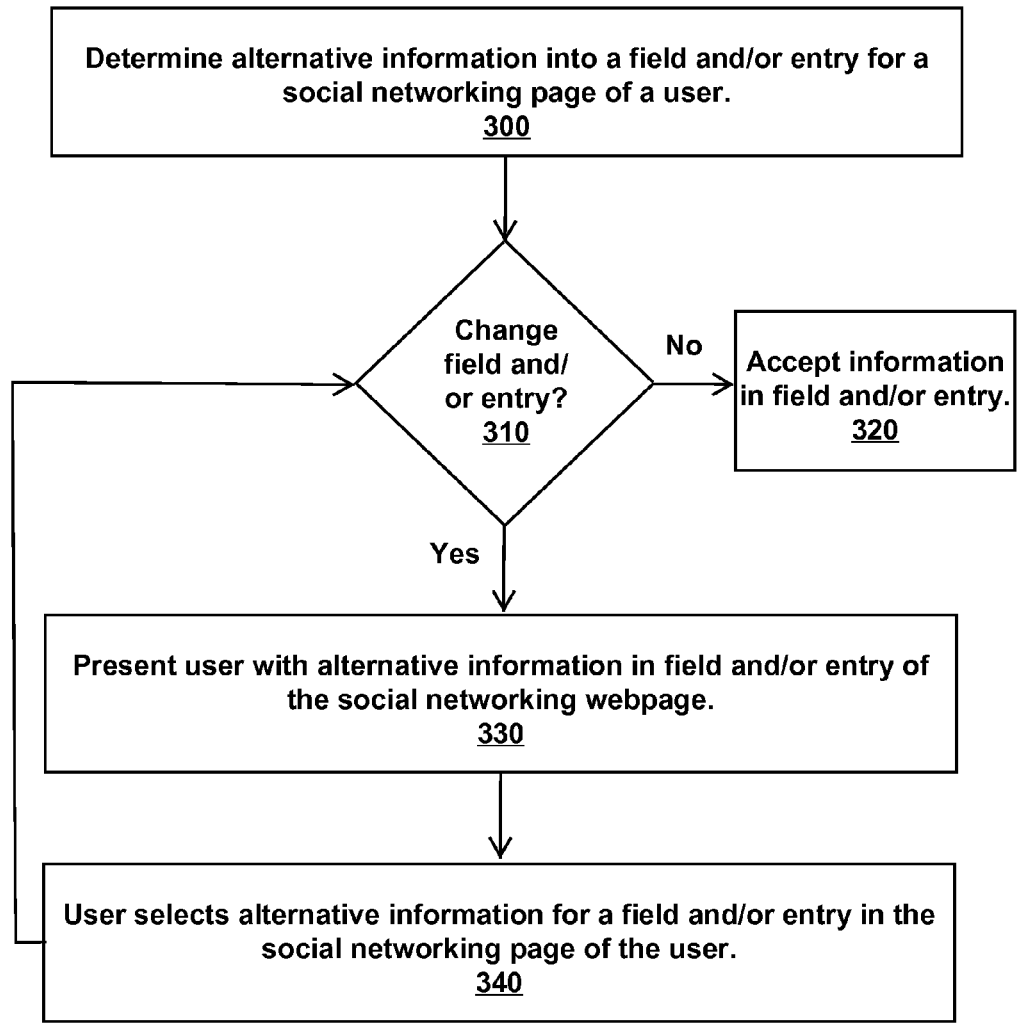
FIG. 3 is a method to present alternative data into fields and/or entries on a social networking webpage in accordance with an example embodiment.

FIG. 3 is a method to present alternative information into fields and/or entries on a social networking webpage in accordance with an example embodiment.

According to block 300, alternative information into a field and/or entry is determined for a social networking webpage of a user. This determination can be made by the user, an electronic device, and/or a user agent of the user.

Some fields and/or entries in a social networking webpage can be populated with different information. Different data options are generated and/or presented as alternatives or choices for the fields and/or entries.

Consider an example in which a social networking website enables users to upload a profile picture that is displayed on a homepage of a user's social networking webpage. This user may have multiple different alternative pictures that can be displayed as the profile picture. A user agent for the user retrieves numerous profile pictures of the user that the user agent believes would be favorite pictures of the user. The user agent reviews, analyzes, and selects one of these pictures and presents the selected picture and the alternative favorite pictures to the user. The user agent can also rank the pictures in a hierarchy (such as providing the user with a first picture that the user agent believes would be a first favorite choice of the user, a second picture that the user agent believes would be a second favorite choice of the user, a third picture . . . ).

According to block 310, a determination is made as to whether the user wants to change a field and/or entry at the social networking webpage. This determination can be made by the user, an electronic device, and/or a user agent of the user. If the answer to this determination is "no" then flow proceeds to block 320, and the user accepts the data presented in the fields and/or entries of the social networking webpage. If the answer to this determination is "yes" then flow proceeds to block 330.

Consider an example in which a user routinely goes out to dinner on Friday night and posts his location on a website (such as posting "Having seafood dinner at the beach"). A machine learning user agent determines from this pattern of previous posts that the user would want to post his location as he has previously done. On the next Friday night, the user goes out to dinner. The user agent determines a geographical location of the user, determines a name of a restaurant where the user is eating, and posts the location of the user on the website on behalf of the user (such as "Having Italian food in Little Italy"). The user agent performs these tasks without instruction from the user to post the information and without knowledge of the user of the information being posted.

According to block 330, the user is presented with alternative information into a field and/or entry of the social networking webpage. The user is presented with different alternatives or choices to complete or fill one or more fields and/or entries of the social networking webpage. These alternatives are provided to the user, such as being displayed to the user on a display of an electronic device, stored in memory, and/or transmitted over a network to the user and/or an electronic device.

According to block 340, the user selects alternative information for a field and/or entry in the social networking webpage of the user. The user can take an action to select alternative data to populate a field and/or entry. For example, the user clicks on one of the data alternatives, speaks or types an acceptance or rejection of a choice being presented, transmits or causes to be transmitted a command to select an option being presented, etc. Flow loops back to block 310.

Consider the example above in which the user routinely goes out to dinner on Friday night and posts his location on a website. On the next Friday night, the user goes out to dinner with his smartphone. While at dinner, the smartphone of the user vibrates and displays a message asking if he wants to post his location (such as stating as follows: "Do you want to post your dinner location?"). The message also displays alternative posts from which the user can select. As such, the user does not have to enter the post. Instead, the user agent already determined the location of the user, determined the name of the restaurant where the user is eating, and presented the user with alternative posts that are based on an analysis of previously approved posts (such as the user agent providing the user with alternatives as follows: "Select a post: (1) Having Italian food in Little Italy, (2) Dining at my favorite Italian restaurant, or (3) Enjoying some delicious Italian food"). The user taps on the screen of the smartphone to select one of the three posts, and the user agent automatically posts the selection to the website.

Figure 4:
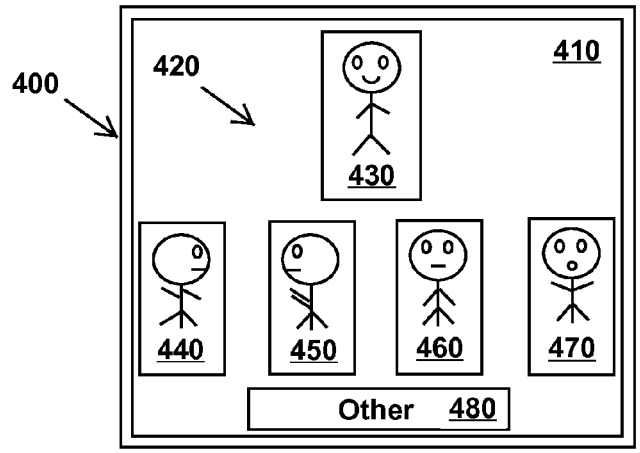
FIG. 4 is an electronic device with a display that presents different data alternatives for a field and/or entry of a social networking webpage in accordance with an example embodiment.

FIG. 4 is an electronic device 400 with a display 410 that presents different information alternatives 420 for a field and/or entry of a social networking webpage. For illustration, FIG. 4 shows a photographic field and/or entry, but other types of fields and/or entries discussed herein can also be presented. In this figure, a single photographic field is duplicated and simultaneously presented multiple times with each photographic field presenting different information (i.e., presenting a different photograph in this example).

By way of example, the display 410 presents the information alternatives 420 in a hierarchical format in which a first or current photograph 430 is presented at the top of the hierarchy. Different alternative photographs 440, 450, 460, and 470 are simultaneously presented below the current photograph 430. For instance, photograph 430 is a current or first choice photograph, such as being a favorite photograph selected by the electronic device and/or user agent. Photograph 440 is a second choice photograph selected by the electronic device and/or user agent. Photograph 450 is a third choice photograph selected by the electronic device and/or user agent. Photograph 460 is a fourth choice photograph selected by the electronic device and/or user agent. Photograph 470 is a fourth choice photograph selected by the electronic device and/or user agent. Box 480 (indicating "Other") enables the user to select a photograph not presented on the display (such as a photograph stored in memory but not currently being displayed).

The user can click on one of the photographs 430, 440, 450, 460, or 470 to indicate this photograph as being selected for the photographic field and/or entry. Alternatively, the user can take no action, and the selected first or presented photograph is selected by default. Alternatively, the user can select and/or approve one of the photographs using another action (such as dragging and dropping one of the photographs to the top position with the photograph at the top position then automatically taking the place of the photograph being dragged, selecting one of the photographs using a pull-down menu option, highlighting one of the photographs with a cursor, speaking the name of one of the photographs, touching the display with a finger at a location where one of the photographs resides, etc.).

Figure 5:
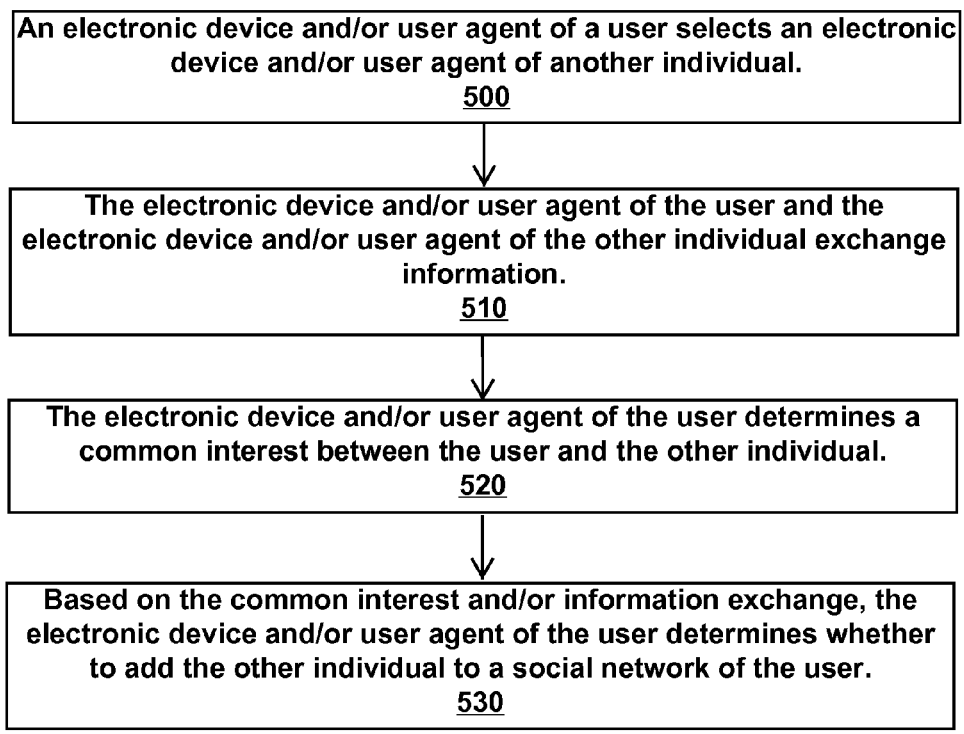
FIG. 5 is a method to discover and add individuals to a social network of a user in accordance with an example embodiment.

FIG. 5 is a method to discover and add individuals to a social network of a user.

According to block 500, an electronic device and/or user agent of a user selects an electronic device and/or user agent of another individual. The electronic device and/or user agent of the user selects the electronic device and/or user agent of another individual based on one or more factors. These factors include, but are not limited to, proximity or geographical distance between the electronic device and/or user agent of the user and the electronic device and/or user agent of the other individual, proximity or geographical distance between the user and the other individual, a previous communication between the user and the other individual and/or their respective user agents, a common interest and/or experience between the user and the other individual, a make or model of the electronic device of the other individual, a familial relation between the user and the other individual, a business relation between the user and the other individual, a past, present, and/or future meeting between the user and the other individual, a request from the user and/or other individual, a physical appearance of the user and/or other individual, demographic information (such as age, gender, race, ethnicity, mobility, home ownership, marital status, employment status, disabilities, income level, etc.) of the user and/or other individual, affiliation (such as religious, political, social, etc.) of the user and/or other individual, a membership of the user and/or other individual, an occupation or hobby of the user and/or other individual, information obtained from a network search that uses a web search engine or web crawler, a random selection, a patterned selection, artificial intelligence (such as a system using an intelligent agent), and a method using probability and/or a statistical method.

According to block 510, the electronic device and/or user agent of the user and the electronic device and/or user agent of the other individual exchange information. For example, the electronic device and/or user agent of the user and the electronic device and/or user agent of the other individual exchange personal information and/or information included in their respective user profiles. As another example, the electronic device and/or user agent of the user and the electronic device and/or user agent of the other individual exchange information discussed in connection with block 200, and/or factors and/or information discussed in connection with block 500.

According to block 520, the electronic device and/or user agent of the user determines a common interest between the user and the other individual. Examples of this common interest include, but are not limited to, personal information, information in and/or associated with a user profile, information discussed in connection with block 200, factors and/or information discussed in connection with block 500, and information and/or data collected, processed, transmitted, and/or stored with an electronic device.

According to block 530, based on the common interest and/or information exchange, the electronic device and/or user agent of the user determines whether to add the other individual to a social network of the user. For example, the electronic device and/or user agent of the user adds the other individual as a friend or contact to the social network of the user. As another example, this other individual is added or saved to an electronic memory, such as a contact list, an address book, or a directory of the user. Information exchanged between the electronic device and/or user agent of the user and the electronic device and/or user agent of the other individual can also be provided to the user, such as being displayed to the user on a display of an electronic device, stored in memory, and/or transmitted over a network to the user and/or an electronic device.

Consider an example in which a user walks around a campus of a university. As the user walks around the campus, a user agent of the user communicates with other user agents of individuals that are also located on the campus and/or other user agents of individuals that are enrolled at the university. The user agents exchange personal information with each other to determine when users have a common interest with each other. The user agents thus help users find friends. A user agent for a user can find a friend that the user otherwise would not have found. This friend and user share common interests with each other. When the user agent for the user finds another individual with sufficient common interest, then this other individual is added to a social networking webpage of the user. The user is informed of this addition after the other individual is already added to the social networking webpage of the user. Further, the actions of the user agents can occur without knowledge of and/or without instruction from their respective users. Thus, users may not be aware that their user agents are communicating with other user agents and/or may not have instructed their user agents to make a communication exchange with a specified or particular other user agent.

Consider an example in which a handheld portable electronic device (HPED) of a user includes, communicates with, and/or executes a software program that locates other individuals who are within proximity of the user (for example, HPEDs and servers in communication with the HPEDs execute the program). The program also causes an exchange of personal information in order to determine individuals that have a common interest with each other. For instance, while a user walks around a shopping mall, the HPED of the user locates other HPED of individuals that are also in the shopping mall (such as locating other individuals that are also physically in the shopping mall, near the shopping mall, or within visual proximity of the user while in the shopping mall). The HPED of the user and the HPEDs of the locating individuals exchange personal information with each other about their respective users. A user of an HPED is notified when another individual with a common interest is discovered. The notification includes a location of the other individual (such as informing the user that the other individual is a specified distance from the user within the shopping mall, showing the user which store in the shopping mall the other individual is located, or showing the user a location of the other individual on a map of the shopping mall that displays on the HPED). This process of locating other individuals and exchanging personal information can occur without knowledge of and/or instruction from the users (for example, the users are not aware that the information exchange is occurring; the users are not aware of a location of other individuals during the information exchange; and/or the users are not aware what information is being exchanged).

In the example above, the software program has authorization and/or privacy settings that provide rules and restrictions with regard to the personal information (such as whether the personal information is encrypted, what electronic devices and/or individuals can access and/or view the personal information, where or how the personal information is stored, when the personal information is shared, when the personal information is deleted, etc.). For instance, these settings are activated so that personal information about users exchanged between HPEDs is kept private and not shared with or disclosed to the individuals. In other words, the HPEDs exchange personal information with each other about their users, but this information is not provided to the users themselves. For instance, a first HPED of a first user provides personal information about the first user to a second HPED of a second user. The second HPED of the second user also provides personal information about the second user to the first HPED. The first user cannot access, obtain, and/or read the personal information provided to the first HPED by the second HPED. Likewise, the second user cannot access, obtain, and/or read the personal information provided to the second HPED by the first HPED. This personal information is restricted, and not available to the users themselves. An exchange of personal information occurs in order for the software program and/or HPEDs to determine whether the first and second users have a common interest. Alternatively, personal information that is exchanged is available to the users, but this information is not sufficient to identify the user. As yet another alternative, the personal information that is exchanged is available to the users.

In an example embodiment, if the first and second users lack a common interest, then the personal information is not provided to the users (for example, the personal information and/or transaction history is deleted). Thus, the software program and/or HPEDs can interact with each other and exchange personal information about their respective users without providing this personal information to the users themselves. As such, users can keep their location, identity, and personal information private.

If the first and second users have a common interest, then these users are notified and a determination is made as to whether they want to have their personal information and/or identities provided to the other user. For example, users may desire more information about each other in order to meet each other in person, contact each other (such as texting each other or telephoning each other), add each other to their respective social networking webpages, locate each other while in the shopping mall, view on displays of their HPEDs pictures and profile information of each other, etc. Furthermore, users may elect to provide personal information but still maintain their true identity private.

Consider an example in which a user wants to obtain business contacts of cardiologists that live in Ohio, specialize in interventional cardiology, and have at least ten years of professional experience. The electronic device and/or user agent of the user searches the Internet for doctors satisfying these criteria. Upon discovering a doctor that satisfies the criteria, the electronic device and/or user agent of the user provides information about the doctor to the user (such as providing contact information, business address, and a location of the doctor).

Consider another example in which a user desires to contact individuals that are translators specializing in translating documents from Chinese language into Thai language. While the user is traveling in Hong Kong, the HPED of the user broadcasts requests to HPEDs of other individuals also located in Hong Kong. This request could include, for example, a description of the desired specialty (such as "Seeking Chinese/Thai Translator"). An HPED of an individual residing in Hong Kong receives this broadcast, compares the request with information in the individual's user profile, and determines a match or a common interest. The individual is fluent in both Chinese and Thai and has previously translated documents between these two languages. The HPED of the individual replies to the request of the HPED of the user, and these two HPEDs exchange information. The HPED of the user determines a high likelihood that the user will be interested in meeting or contacting this individual and provides the user with contact information for this individual and information relating to the exchange between the two HPEDs (such as the user agent sending a message to the user that states as follows: "I found an individual residing in Hong Kong that has expertise in translating documents between Chinese and Thai. I spoke to the user agent of this individual. Please click on the hyperlink below to view a resume and contact information of this individual.").

Consider another example in which the user is a single female that recently moved to New York City. She wants to meet new female friends that are 20-25 years old, Catholic, and live within 2 kilometers of Central Park. While she is exercising in Central Park, she carries a portable electronic device that uses a GPS service to locate other portable electronic devices that are also currently in Central Park. The electronic device of the female contacts these other electronic devices, exchanges user profile information with these devices, and discovers another female matching the criteria (such as another female carrying a portable electronic device and jogging in the park). The electronic device of the searching female and the electronic device of the discovered female agree to present their respective owners/users with a proposal to meet. For example, the electronic device of the searching female vibrates and displays the following message: "Found another single female in Central Park. She is 22 years old, Catholic, likes to exercise, and is also new to the New York area. Do you want to meet her?"

If both parties agree to meet, then the electronic devices can exchange further information and arrange to meet (such as exchanging names, phone numbers, GPS locations within the park, text messages, etc.).

Consider another example in which a user belongs to social networking service ABC, enjoys hang gliding, and likes to read French plays by Molière. A user agent for the user periodically searches profiles of other members of ABC and discovers another user member that enjoys hang gliding and reading French literature. Based on this common interest between the user and the other member, the user agent of the user sends a friend request to the other member. This friend request asks the other member to join a circle of friends of the user. This friend request can be sent with or without prior approval of the user. For example, if the user has confidence in the accuracy of the user agent sending friend requests, then the user can authorize the user agent to send requests without first receiving specific authorization for each subsequent request. As such, the user may not be aware that the user agent sent the friend request until after the request is already sent (for example, the user agent notifies the user that a friend request was sent, or the user logs into the social networking service ABC and sees that the user agent previously sent the friend request).

Consider another example in which a user belongs to a social networking service (such as FACEBOOK). The user receives a friend request from another user in which this other user requests to be added to the networking webpage and social networking circle of the user. The user is not aware of this request, but has previously authorized his user agent to analyze such requests and to grant or to deny such requests without further input from the user. As such, the user agent is authorized to act on behalf of the user without knowledge of or approval by the user. Upon receiving this request, the user agent of the user visits the social networking webpage of the requesting user and reviews the profile information of this user. Based on this review, the user agent determines that the user and the requesting user have sufficient common interest, and the user agent grants the friend request. The requesting user is added to the list of friends of the user.

Consider an example in which a user carries an electronic device that continually, continuously, or periodically searches for other electronic devices within proximity of a radius of one kilometer. For instance, this electronic device broadcasts requests to communicate with other electronic devices. Alternatively, one or more other electronic devices broadcast the requests. Such requests can be sent directly from one electronic device to another device or sent indirectly from one electronic device to another electronic device (such as sending requests through a cloud, satellite, server, or other computer). Upon discovering other such electronic devices, the electronic device of the user solicits employment opportunities for an individual having the education and professional experience of the user. The electronic device assists the user in finding employment. For example, the electronic device of the user and an electronic device of another person begin to exchange information relating to education and employment history. During this information exchange, the electronic device of the user informs the electronic device of the other person that the user has an expertise in residential home remodeling and construction. The electronic device of the other person responds that the other person is interested in renovating a bathroom. The electronic devices of the users notify their corresponding users about the information exchange. For example, the electronic device of the user displays the following message: "I found a customer that is seeking to remodel a bathroom. The customer's name is Paul. Do you want more information about Paul and this remodeling job?"

In some example embodiments, the users are notified about the exchange of their personal information after the exchange already occurred. In other words, the users were not aware that their respective electronic devices and/or user agents were exchanging personal information with each other. Further, the users did not instruct their HPEDs to make the exchange. Thus, the users agents were acting on behalf of the users but without knowledge of and/or instruction from the users to take such specific action at that time. For example, HPEDs act on behalf of the users since the users trusted the judgments and decisions of the HPEDs. After the exchange occurs, the HPED of the user sends the user a message that notifies the user of the exchange. As an example, the HPED sends the following message: "I just communicated with someone that I think you would be interested in meeting. Enclosed is a picture of this person, location information, and contact information. I also provided this person with your picture and contact information." As another example, a user agent for the user causes the following message to appear on a display of the HPED of the user: "I just added a new friend to your social network. Please activate the hyperlink below to see your new friend." Activation of the hyperlink automatically navigates the user to a social networking page of the newly added friend.

Figure 6:
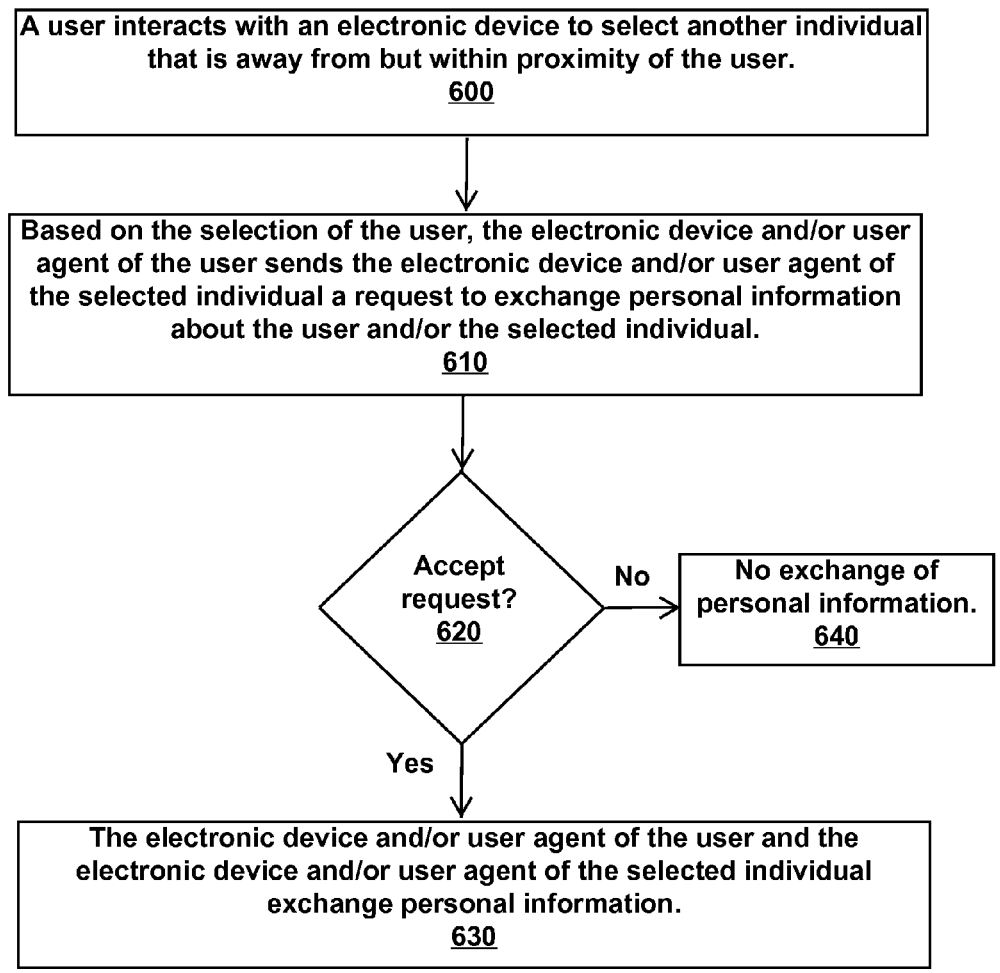
FIG. 6 is another method to discover and add individuals to a social network of a user in accordance with an example embodiment.

FIG. 6 is a method to discover and add individuals to a social network of a user.

According to block 600, a user interacts with an electronic device to select another individual that is away from but within proximity of the user. For example, the user selects an individual within a visual proximity or within a specified geographical distance of the user even though the individual cannot be scene.

The user can interact with the electronic device in different ways to select another individual. These ways include, but are not limited to, taking a photograph of the other individual, searching for the other individual over the internet, telephoning the other individual, using a pointing device to select the other individual, providing a physical description of the other individual, using GPS to identify a location of the other individual, selecting individuals within a specified geographical distance of the user (such as selecting individuals within 10 meters, 20 meters, 30 meters, 40 meters, . . . one-eighth of a mile, one quarter of a mile, etc.), and selecting individuals with a certain physical appearance.

According to block 610, based on the selection of the user, the electronic device and/or user agent of the user sends the electronic device and/or user agent of the selected individual a request to exchange personal information about the user and/or the selected individual. The electronic device of the user locates and communicates with the electronic device of the selected individual. For example, a user agent of a first user asks a user agent of a second user whether the two user agents can exchange personal information about their users with each other.

The electronic device of the selected individual can be physically located on or with the selected individual. For example, the selected individual carries or has possession of a smartphone or tablet computer. Alternatively, the electronic device can be located remotely from the selected individual. For example, the selected individual is within sight of the user, but the selected individual's electronic device is remotely located from the user.

According to block 620, a determination is made as to whether the electronic device and/or user agent of the selected individual accepts the request to exchange personal information. This determination is made by the selected individual, the electronic device, and/or the user agent of the selected individual. If the answer to this determination is "yes" then flow proceeds to block 630. If the answer to this determination is "no" then flow proceeds to block 640.

According to block 630, the electronic device and/or user agent of the user and the electronic device and/or user agent of the selected individual exchange personal information. During this communication, the electronic device and/or user agent of the user and the electronic device and/or user agent of the selected individual exchange information, such as exchanging personal information, user profile data and/or information discussed in connection with block 500 of FIG. 5. For example, user agents of the two individuals exchange user profile data about their respective users. As another example, the electronic device of the selected individual provides personal information about the selected individual to the electronic device of the user, and the electronic device of the user provides personal information about the user to the electronic device of the selected individual.

According to block 640, the electronic device and/or user agent of the user and the electronic device and/or user agent of the selected individual do not exchange personal information.

Consider an example in which the user sees a group of other people that are not known to the user. The user takes a picture of these people, and this picture displays on the smartphone of the user. The user touches the display screen of the smartphone to select one of the individuals in the picture. This selection identifies to the smartphone which individual the user selected among the other people. This selected individual also carries a smartphone. The smartphone of the user contacts the smartphone of the selected individual and provides a friend request. This friend request asks whether the selected individual wants to join or be included in a social network of the user. If the electronic device of the selected individual accepts the friend request, then the selected individual is added as a friend to the social network of the user. If the electronic device of the selected individual refuses the friend request, then the selected individual is not added as a friend to the social network of the user. Alternatively, the smartphone of the user sends the smartphone of the selected individual a request to exchange personal information (such as name, address, photographs, and/or phone number).

Consider an example in which a user carries an HPED. The user sees a stranger and desires to communicate with this stranger, such as desiring to find out more information about this stranger. The user points the HPED toward the stranger in order to locate and identify the stranger to the HPED. In response to this identification, the HPED attempts to and/or begins to communicate with an HPED that the stranger is carrying. The HPED of the stranger accepts the communication, and the two HPEDs exchange personal information about their respective users. For instance, the HPEDs exchange phone numbers and pictures of their respective users. The HPED of the user then sends a text to the HPED of the stranger (such as "Nice to meet you. Thanks for exchanging pictures and phone numbers with me.").

Consider another example in which the user has an HPED that includes an electronic pointing device (such as a device that transmits a laser, infrared, ultrasound, radio waves, etc.). The user transmits a wave or signal on or near another person to identify a location of this other person to the HPED of the user. In response to this action, the HPED of the user transmits an electronic request to the electronic device of the other person. This request, for example, could say: "Hello, my name is John. Can I add you to my social network? Thank you." The electronic device of the other person is authorized to act on behalf of this person. In response to this request, the electronic device of the other person responds to the request, such as saying: "Hi, my name is Anne. Yes, I will join your social network." Thereafter, the two electronic devices exchange further information, and the other person is automatically added to the social network of the requesting user. The two users were not aware of the transmissions, information exchanges, and/or addition of users to the social networks until after the users are already added to the respective social networks of the other user.

Consider another example in which the user takes a video or photograph of another person, and analysis of a face of the person determines an identity of the person. Facial recognition software of the user assists in identifying this other person. For instance, the face of the individual in the photograph is analyzed and/or compared with facial images in a database. A facial image search or reverse facial image search can also be performed on the Internet to locate and determine an identity of the person. This identify includes contact information of this person, such as a phone number, an Internet address, an email address, a social network website location, a unique user identification on an instant messaging platform (for example, WHATSAPP or KAKAO-TALK), etc. A user agent of the user then contacts this person and/or a user agent of this person. This contact includes a request to exchange personal information between the user and the other person.

Consider another example in which the user sees a person with whom the user would like to communicate. The user instructs the electronic device to use a wireless communication system or a broadcast communication system to send a signal to the electronic device located with this person. The electronic device of this person begins to communicate with the electronic device of the user. During this communication, the electronic device of the user sends to the electronic device of this person a description of the professional profile of the user. For example, this professional profile includes the name and picture of the user, occupation, and contact information (such as stating: "My name is John Smith. I am a doctor specializing in pediatric intensive care. I work at Johns Hopkins Hospital. Please visit my website for office hours and more information."). The message could also include a hyperlink to the website and a picture of the user.

Consider an example in which electronic devices of the users include and/or execute a software application that enables the electronic devices to locate, identify, and communicate with each other. A user is walking in a crowded mall and sees a person that the user would like to meet. The user and the other person do not know each other, and the other person is not aware that the user wants to communicate. The user instructs his electronic device to contact the electronic device of the other person. Since both the electronic device of the other person and the electronic device of the user are running the software application, the electronic devices locate and communicate with each other. The electronic devices begin to exchange personal information about their respective users, and a determination is made by one or both of the electronic devices that the users will not meet or further exchange more personal information. For example, the electronic device of the other person indicates that the other person is not interested in meeting the user. In this example, the electronic device of the other person reviews a calendar schedule and determines that the other person is too busy to meet. Alternatively, the electronic device of the other person determines that there is insufficient common interest between the two people to warrant further information exchange. These determinations and transactions can occur without knowledge of the other person or the user since the electronic devices of both people are acting on behalf of their respective users. Alternatively, the users can be notified before, during, or after the communications between the two electronic devices commences or ends.

Communication between the electronic devices of the users can be automated and executed by user agents and/or other software programs and applications. As such, users are not required to be involved in and/or have knowledge of the information exchange and/or other blocks discussed in the methods herein. Instead, electronic devices, user agents, software programs, and/or software applications act on behalf of their users, and act in a manner consistent with authorization and/or privacy settings. These actions reduce the time and effort required for users to exchange information. As such, a user agent for a user can add and remove friends from a social networking webpage of the user, exchange personal information, exchange business contact information, search and/or seek users with a common interest, and perform other tasks discussed herein. The user agent works and performs tasks on behalf of the user to increase a social network of the user. For instance, the user agent can exchange user profile information with other user agents and add new professional or social contacts to a social network of the user.

Figure 7:
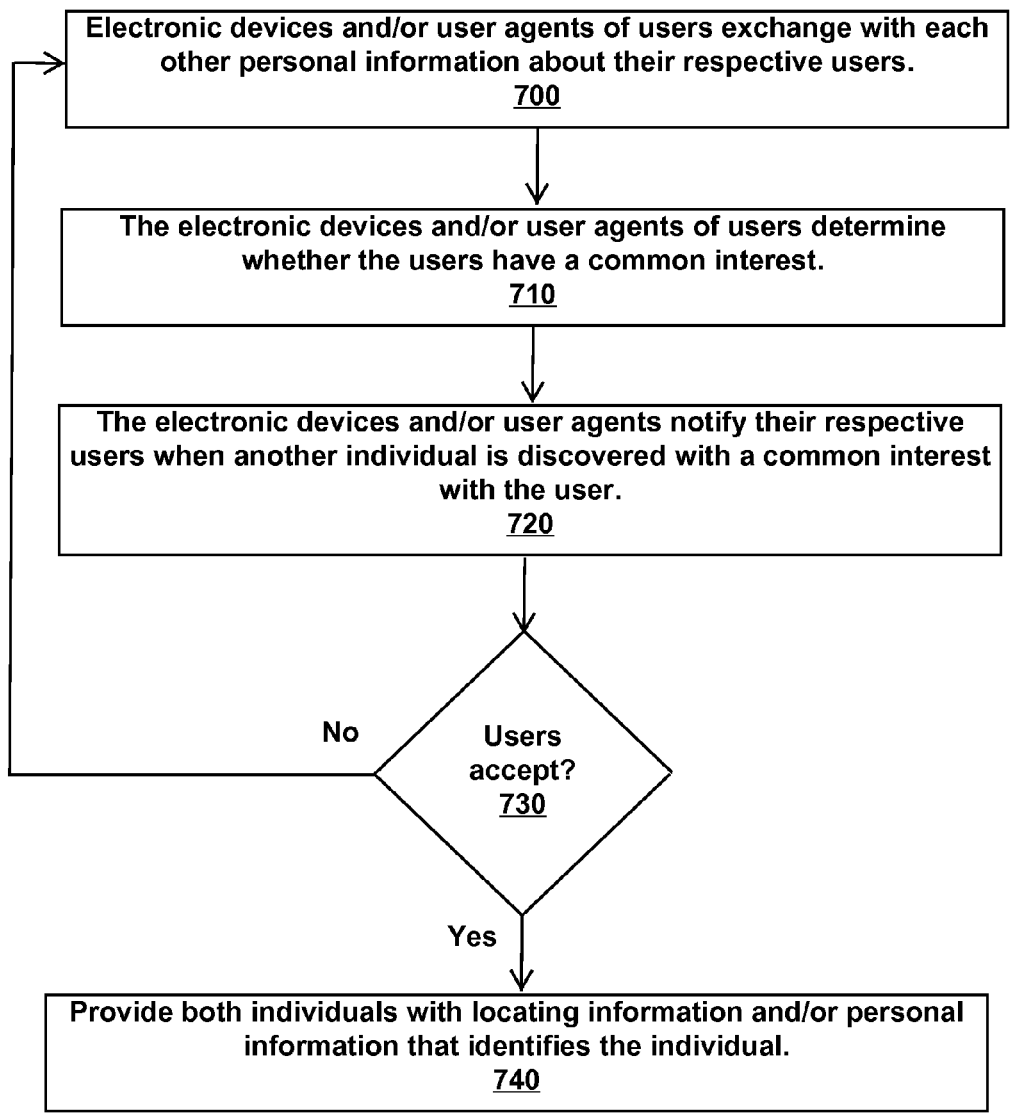
FIG. 7 is a method to discover individuals with a common interest within proximity of each other in accordance with an example embodiment.

FIG. 7 is a method to discover individuals with a common interest within proximity of each other.

According to block 700, electronic devices and/or user agents of users exchange with each other personal information about their respective users. These electronic devices and/or user agents transmit and receive personal information about their respective users. For example, this information includes, but is not limited to, user profile data, information discussed in connection with block 200, and/or factors and/or information discussed in connection with block 500.

Consider an example in which in order to initiate an exchange of personal information or communication with each other, the electronic devices are within a predetermined distance from each other. For example, an exchange of information and/or communication occurs when the electronic devices are within a certain distance of each other, such as within one hundred feet, five hundred feet, one-eighth of a mile, one quarter of a mile, etc. Each user selects a distance, such as a user instructing his electronic device to communicate with other electronic devices within one hundred meters of the user. Alternatively, the distance can be set by another person or party, such as being set by a manufacturer, merchant, communication provider, third party, other user, etc.

According to block 710, the electronic devices and/or user agents determine whether the users have a common interest. The electronic devices and/or user agents provide each other with personal information about their users to discover whether the users have common interests with each other.

In an example embodiment, the electronic devices and/or user agents exchange personal information about their users but maintain anonymity during the information exchange. As such, even though personal information is being exchanged between the electronic devices, an identity of a user and/or personal information sufficient to identify a user is not provided. Thus, the identity of the users remains private during information exchange. By way of example, the personal information being exchanged would not include one or more of a real first and last name of the user, a home or business address of the user, a telephone number of the user, a location of the user, a website of a user, and/or a picture of the user. Personal information can still be exchanged while keeping an identity of the user confidential and/or secure. By way of example, the personal information about the users being exchanged could include one or more of age, gender, marital status, common interests, physical description (such as height, weight, color of eyes and hair, etc.), religion, username, first name, occupation, education, ethnicity, hobbies, sports, interests or reasons in meeting other people, likes and dislikes, etc.

In an example embodiment, the identity of the users remains private during information exchange until an event occurs. Such events include, but are not limited to, one and/or both of the users agreeing to disclose sufficient personal information to identify themselves, one and/or both of the user agents of the users agreeing to disclose sufficient personal information to identify their respective users, one and/or both of the electronic devices of the users agreeing to disclose sufficient personal information to identify their respective users, one and/or both of the users determining that a common interest exists between the users, one and/or both of the user agents of the users determining that a common interest exists between the users, and/or one and/or both of the electronic devices of the users determining that a common interest exists between the users.

Consider an example in which two electronic devices are exchanging personal information with each other about their respective users. These electronic devices exchange employment history, educational information, and other information relating to the professional expertise of the users. The identity of each user, however, is not disclosed or discernable since their identities are private and/or confidential. As such, the electronic devices and/or users do not know enough information to identify the other user. Furthermore, during this information exchange, the users are not informed that the two electronic devices are exchanging information. Further yet, the electronic devices exchange information without explicit instructions by their respective users to make the information exchange. Alternatively, the users are informed of the information exchange and/or provide instructions to make the information exchange.

According to block 720, electronic devices and/or user agents notify their respective users when another individual is discovered with a common interest with the user. When an electronic device and/or user agent of a user discovers another individual having common interest with the user, the electronic device and/or user agent notifies the user. For example, the notice is displayed to the user on a display of an electronic device, stored in memory, and/or transmitted over a network to the user and/or an electronic device.

Consider an example in which an electronic device of a user attempts to find other individuals with a specified common interest with the user. This electronic device communicates and exchanges information with other electronic devices that are within a radius of two miles. When the electronic device discovers another electronic device and corresponding individual, the electronic device notifies the user of this discovery. For example, the electronic device vibrates and displays a message about this discovery to the user.

According to block 730, a determination is made as to whether both individuals accept to meet and/or exchange personal information that identifies the individuals. This determination can be made by the users, the electronic devices, and/or user agents of the users. If the answer to this determination is "yes" flow proceeds to block 740. If the answer to this determination is "no" flow proceeds back to block 700.

According to block 740, both individuals are provided with locating information and/or personal information that identifies the individuals.

The locating information can include a physical location of where the individual is currently located or where the individual will be located at a future time. Examples of such information include, but are not limited to, a GPS coordinate location, a description of the location (such as "located across the street in the coffee shop"), an address, a proximity (such as "located fifty feet to the East of you"), a display indication on a map (such as providing a map with a marker or blinking icon that shows the location of the person on a map), etc.

The personal information that identifies the individuals can include information specific enough to identify and/or contact the other individual. Examples of this information include, but are not limited to, a real name of the person, a picture of the person, a home or business address of the person, a telephone number of the person, an email address of the person, and/or a hyperlink to a website of the person (such as a hyperlink to a social networking webpage of the person).

In an example embodiment, the information to locate the user and to identify the user are not disclosed to the other individual until the user, the user agent of the user, and/or the electronic device of the user authorizes disclosing the information to locate the user and to identify the user. Likewise, the information to locate the other individual and to identify the other individual are not disclosed to the user until the other individual, the user agent of the other individual, and/or the electronic device of the other individual authorizes disclosing the information to locate the other individual and to identify the other individual.

FIGS. 8A, 8B, 9A, and 9B show electronic devices of two users that discover and/or communicate each other. The users have a common interest, and their respective electronic devices show the common interest on the respective displays. For discussion, the users are designated as first user and second user with FIGS. 8A and 8B being the electronic device 800 of the first user and FIGS. 9A and 9B being the electronic device 900 of the second user.

Figure 8A:
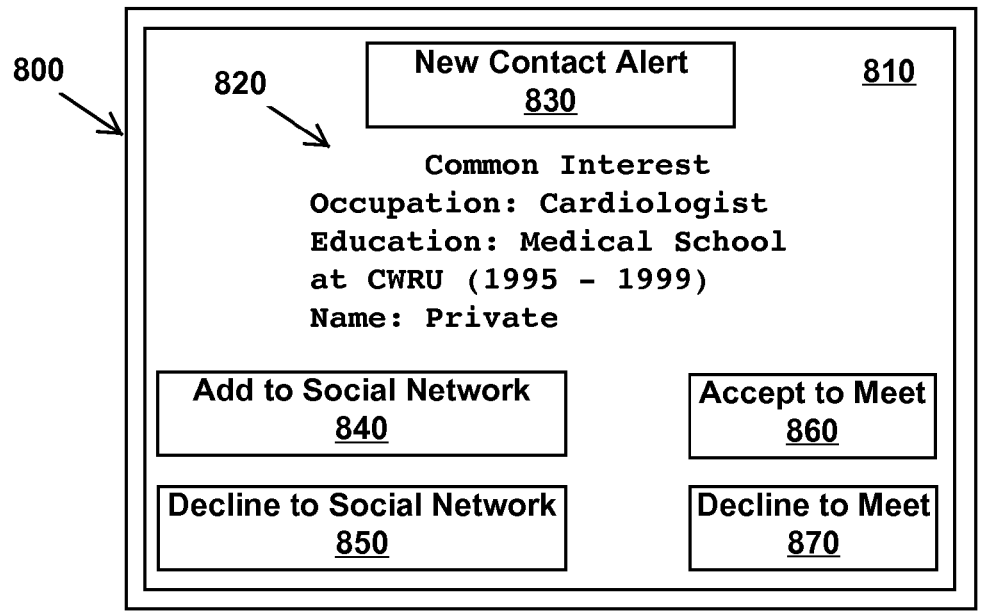
FIG. 8A is an electronic device of a first user with a display that shows a common interest between the first user and a second user in accordance with an example embodiment.

FIG. 8A is the electronic device 800 of the first user with a display 810 that shows a common interest 820 between the first user and the second user. The display 810 shows a message 830 ("New Contact Alert") that notifies the first user that an individual (i.e., the second user) with a common interest has been discovered. The common interest 820 with the second user is displayed to the first user. By way of illustration, this common interest shows that the second user is a cardiologist and attended medical school at Case Western Reserve University from 1995-1999. The name of the second user is private (i.e., not currently being disclosed to the first user).

Figure 9A:
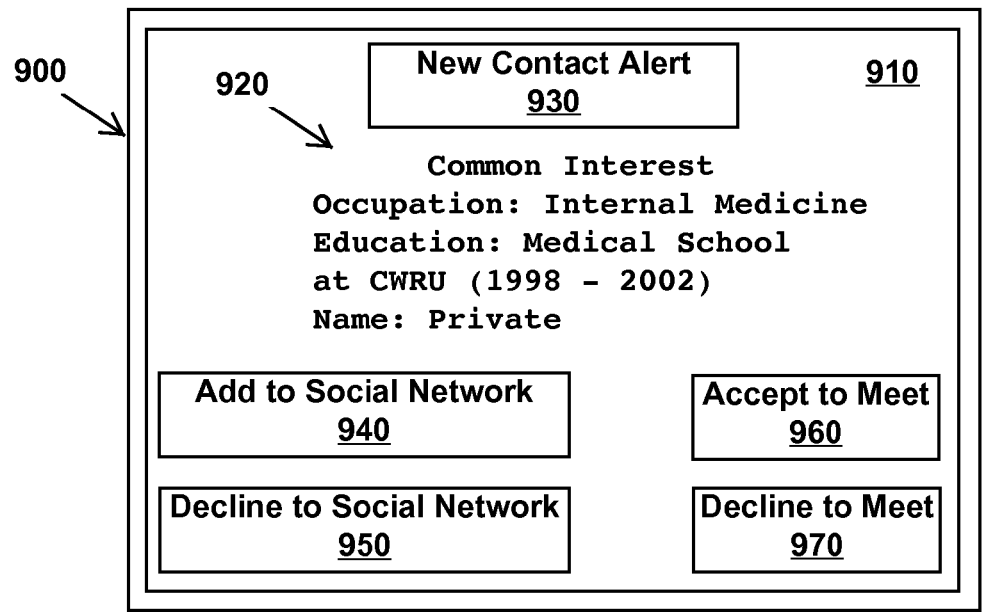
FIG. 9A is an electronic device of the second user with a display that shows a common interest between the second user and the first user in accordance with an example embodiment.

FIG. 9A is the electronic device 900 of the second user with a display 910 that shows a common interest 920 between the second user and the first user. The display 910 shows a message 930 ("New Contact Alert") that notifies second user that an individual (i.e., the first user) with a common interest has been discovered. The common interest 920 with the first user is displayed to the second user. By way of illustration, this common interest shows that the first user is a doctor that specializes in internal medicine and attended medical school at Case Western Reserve University from 1998-2002. The name of the first user is private (i.e., not currently being disclosed to the second user).

The electronic devices 800 and 900 provide the first and second users with options on how to proceed with each other. Example options include, but are not limited to, enabling the users to ignore the discovered individual, to add the discovered individual to a social network of the user, to decline the discovered individual and/or to decline further information exchange with this discovered individual, to accept the discovered individual and/or accept further information exchange with this discovered individual, to accept to meet the discovered individual, to decline to meet the discovered individual, to accept to exchange more personal information with the discovered individual (such as personal information that identifies a true name of the user, a phone number of the user, a location of the user, an address of the user, a picture of the user, etc.), to delete the discovered individual, etc.

By way of illustration, FIG. 8A shows the first user being provided with options to add the second user to a social network of the first user 840 ("Add to Social Network"), to decline the second user to the social network of the first user 850 ("Decline to Social Network"), to accept to meet the second user 860 ("Accept to Meet"), and to decline to meet the second 870 ("Decline to Meet").

By way of illustration, FIG. 9A shows the second user being provided with options to add the first user to a social network of the second user 940 ("Add to Social Network"), to decline the first user to the social network of the second user 950 ("Decline to Social Network"), to accept to meet the first user 960 ("Accept to Meet"), and to decline to meet the first 970 ("Decline to Meet").

Figure 8B:
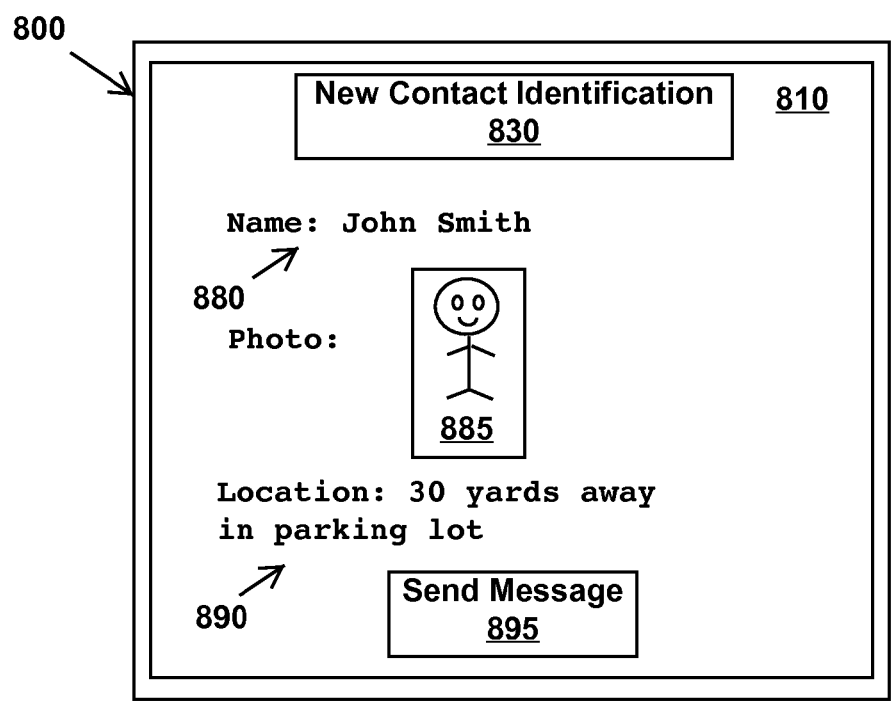
FIG. 8B is the electronic device of FIG. 8A that shows to the first user identifying and locating information of the second user in accordance with an example embodiment.

FIG. 8B is the electronic device 800 with the display 810 that shows to the first user identifying and locating information of the second user. For example, this display appears when the first user activates box 860 in FIG. 8A. The electronic device of FIG. 8B displays personal information that identifies the second user as the individual 880 (shown as "Name: John Smith"). This personal information that identifies the second user also includes a photograph 885 of the second user. The display 810 also includes locating information 890 that provides a location of the second user (shown as "Location: 30 yards away in parking lot"). The display 810 further includes a contact area 895 that enables the first user to contact the second user (such as enabling the first user to telephone the second user or send the second user a text message).

Figure 9B:
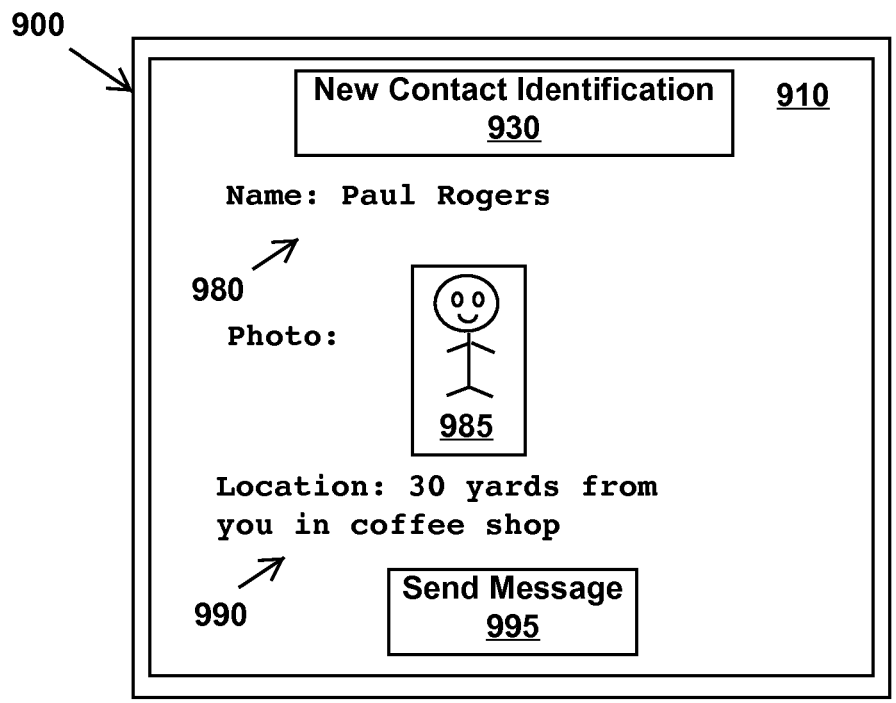
FIG. 9B is the electronic device of FIG. 9A that shows to the second user identifying and locating information of the first user in accordance with an example embodiment.

FIG. 9B is the electronic device 900 with the display 910 that shows to the second user identifying and locating information of the first user. For example, this display appears when the second user activates box 960 in FIG. 9A. The electronic device of FIG. 9B displays personal information that identifies the first user as the individual 980 (shown as "Name: Paul Rogers"). This personal information that identifies the first user also includes a photograph 985 of the first user. The display 910 also includes locating information 990 that provides a location of the first user (shown as "Location: 30 yards from you in coffee shop"). The display 910 further includes a contact area 995 that enables the second user to contact the first user (such enabling the second user to telephone the first user or send the first user a text message).

In an example embodiment, interests between users are compared to determine when the users have a common interest. For example, interests among users are compared to determine which interests match, which interests are similar, and/or which interests are common. A user, an electronic device of the user, and/or a user agent of the user can determine which interests are compared, which interests are not compared, a priority or hierarchy for interests, how interests between users are compared, when interests are deemed common, etc.

Figure 10:
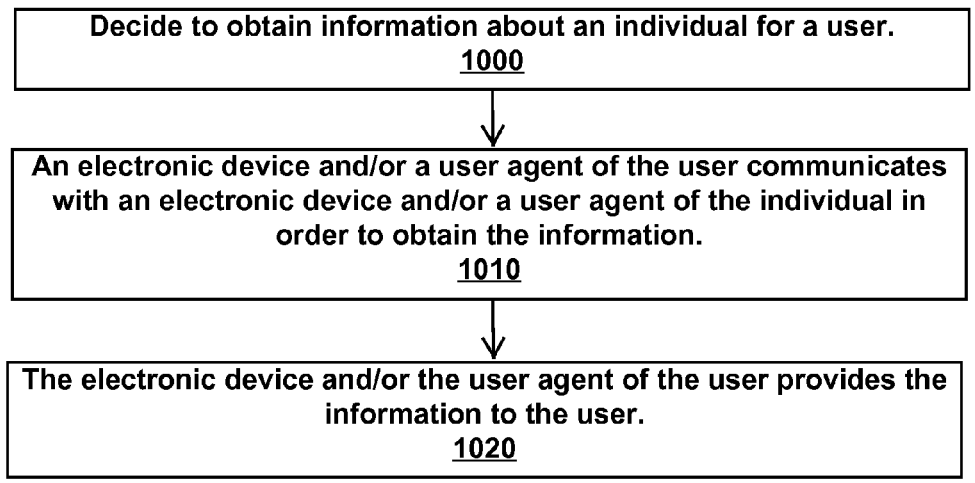
FIG. 10 is a method to obtain information about an individual for a user in accordance with an example embodiment.

FIG. 10 is a method to obtain information about an individual for a user.

According to block 1000, a decision is made to obtain information about an individual for a user. This decision can be made by a user, an electronic device, and/or a user agent of the user.

According to block 1010, an electronic device and/or a user agent of the user communicates with an electronic device and/or a user agent of the individual in order to obtain the information.

According to block 1020, the electronic device and/or the user agent of the user provides the information to the user. For example, the information is displayed to the user on a display of an electronic device, stored in memory, and/or transmitted over a network to the user and/or an electronic device.

Consider an example in which a user desires to obtain location, home address, and cellular phone information about an individual who is a member or friend on a social networking website of the user. The user instructs or requests his electronic device to obtain this information. The electronic device searches the social networking website and performs an Internet search for this requested information, but it is not available from these sources. So, the electronic device contacts a handheld portable electronic device (HPED) of the individual. The HPED of the individual and the electronic device of the user exchange information with each other. The electronic device of the user then presents the requested information to the user.

Consider an example in which a user agent of a user determines that the user has not communicated with a previous business associate for more than one month. The user agent decides to locate this business associate and provide an update to the user. This decision to obtain and provide the update is made without knowledge of and without a specific request from the user. The user agent navigates to a website of the business associate, obtains contact information for a user agent of this business associate, and then contacts and communicates with the user agent of this business associate. During the communication, the two user agents exchange updated profile information about their respective users. Based on this communication, the user agent of the user updates contact information that the user has for the business associate. The user agent also provides the user with an update. For example, the user agent displays a message on the HPED of the user: "I thought you might want an update on your previous business associate John Smith. John is doing great. He is currently in Hong Kong working on a television commercial. I updated your electronic address book with his new contact information."

Consider an example in which a user requests his electronic device to find out what a childhood friend named Rom is doing. For example, the user speaks the following command to his electronic device: "Please contact Rom and find out how he is doing." In response to this request, the electronic device searches the social networking webpage of the user, identifies Rom and his last name, finds a cellular phone number for Rom, and sends Rom a text message. After Rom and the user agent exchange several text messages, the user agent provides the user with an update based on the information obtained in the text messages. For example, the user agent provides the user with an email that states: "I contacted Rom as you requested. He is doing great. He recently went on a trip with his family to the Philippines: enclosed is a link to some pictures. He is still working as a freelance photographer, and is currently in Hong Kong on a photo shoot. I also sent him some pictures of you surfing in Indonesia."

Consider an example in which a software application of a user is instructed to periodically or continually provide updates to an electronic business contact list of the user. The software application obtains a list of business contacts for the user and then crawls and/or searches the Internet for each of these business contacts. Information obtained in the Internet searches is compared with information stored for each business contact in order to update the records of the business contacts for the user. Updated contact information is thus available when a user desires to contact on these business contacts.

Figure 11:
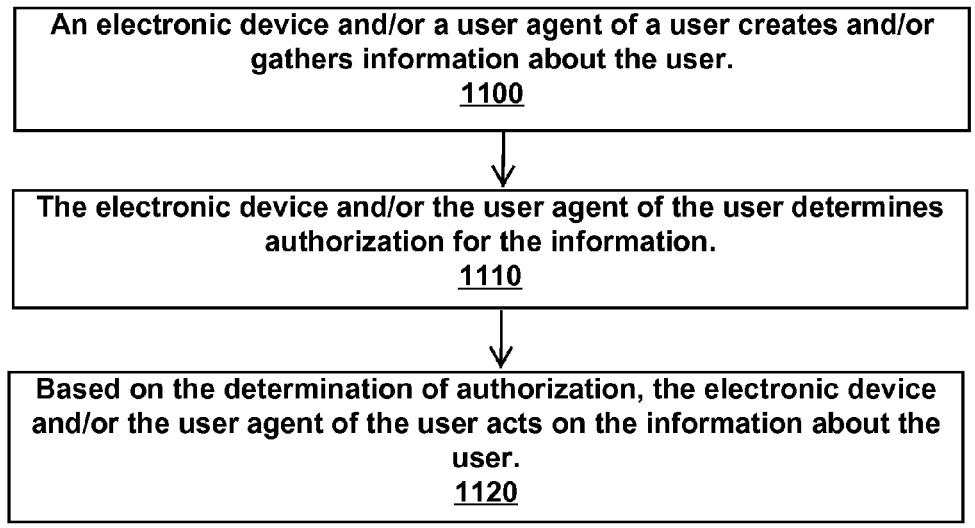
FIG. 11 is a method to create and/or gather information about a user and act upon this information in accordance with an example embodiment.

FIG. 11 is a method to create and/or gather information about a user and act upon this information.

According to block 1100, an electronic device and/or user agent of a user creates and/or gathers information about the user. Information is obtained from sources that include, but are not limited to, one or more networks (such as the Internet), electronic devices, memory and/or storage devices, individuals, and/or the user. Examples of information include, but are not limited to, one or more of physical activities of a user, geographical locations of a user (such as past locations visited, a current location, or an intended future location), interactions between a user and a user interface (UI) and/or a graphical user interface (GUI), photographs and/or videos, user preferences, user profile information, spoken and/or typed words, examples of information discussed in connection with block 200, and/or factors and/or information discussed in connection with block 500.

The electronic device and/or user agent can gather existing information about the user. Consider an example in which an electronic device of a user locates and retrieves photographs stored in memory.

Consider another example in which a user schedules a routine physical checkup with a doctor and logs an appointment for the checkup in an event calendar. After the appointment, the user agent of the user queries the user and asks if everything is okay. The user speaks a response as follows: "Checkup went great. Everything is okay. I'm healthy." The user agent then posts or provides on the Internet information about the doctor visit (such as posting on the social network of the user as follows: "Just had a routine doctor's visit. Doc says I'm doing great and healthy.").

In addition to gathering information, the electronic device and/or user agent can create information and/or events about or associated with the user. This information may not have previously existed. As such, the electronic device and/or user agent can generate or produce the information. Actions of the electronic device and/or user agent thus cause information and/or an event to be created. But for the action of the electronic device and/or user agent, the information and/or event would not have been created and/or would not exist. Some examples are provided below.

Consider an example in which a user agent searches a photographic library and determines that an updated or current picture of the user does not exist. In response to this determination, the user agent turns on and/or activating a camera of a portable electronic device and instructs the camera to take some pictures of the user. The user agent updates the photographic library with the pictures, selects a favorite pictures, transmits the favorite pictures to the father of the user, and posts the favorite picture to a social networking website of the user. The user agent performed these actions without knowledge of the user and/or without instruction from the user to perform such actions. Actions of the user agent created these pictures that did not previously exist. In other words, the user agent did not retrieve existing pictures from memory, but caused a camera in an electronic device to generate the pictures.

Consider another example in which a user is working from his notebook computer. The user agent asks the user if he wants to take a short break from working, and the user affirms that he does. Without a request or command from the user, the user agent retrieves some videos of the user when he was a young boy and plays these videos to the user on a display of the notebook computer. While the user is watching the videos, the user agent activates a camera of the notebook computer and captures video of the user laughing at the videos playing on the computer. Actions of the user agent caused or assisted in causing the user to laugh, and as such, the user agent was able to create new video of the user laughing.

Consider another example in which a user agent of a user contacts a family member or friend of the user. The user agent initiates a conversation with this family member or friend, and in the process of having this conversation generates new information about the user and/or generates a new event for the user. For example, text messaging or voice exchange occurs between the user agent and the user's mother. During this conversation, the user agent informs the mother that her son (i.e., the user) has been working long hours and may not be feeling well. The user agent derives this conclusion from observations of the user and information collected (such as information from a conversation between the user and a friend, observations of the user, tracking of the user's working hours, medicine that the user orders online, visit with a doctor, etc.). The mother instructs the user agent to schedule a lunch date tomorrow between her and her son in the event calendar of her son. The conversation between the user agent and the mother caused the mother to schedule the lunch appointment with her son. But for the actions of the user agent in this conversation, the mother would not have scheduled the appointment and had lunch with her son the next day. Furthermore, the actions of the user agent contacting the family member, communicating with the family member, and scheduling the appointment occur without knowledge of the user and without instruction from the user to perform such tasks.

Consider another example in which a user agent of a user retrieves from an electronic device of the user a GPS location of the user as being at a restaurant. The user agent reviews the privacy settings for the user and determines that locations of the user are restricted and held confidential. The user receives a text from a business associate, and the text asks what the user is doing and where the user is located. A user agent for the user reviews the text message and responds on behalf of the user stating, for example, as follows: "I'm out getting a bite to eat." A location of the user is not disclosed since this information is restricted. The user was not involved in the decision process of reviewing the text message and creating a response to this message since the user agent acts on behalf of the user to conduct these acts.

According to block 1110, the electronic device and/or user agent of the user determines authorization for information. This determination includes, but is not limited to, determining whether the information is public and/or private, what permissions and/or restrictions are placed with the information, where the information can be stored, whether the information is stored in a protective manner (such as being encrypted or password protected), who has access to view and/or retrieve the information, how long the information is stored and/or available, whether the information is saved or deleted, whether the information is transmitted, whether the information is shared with other humans and/or other user agents and/or other electronic devices (such as sharing the information with a user agent of another person other than the user), and whether or how the information is altered (such as altering a photograph to improve its visual quality).

According to block 1120, based on the determination of authorization, the electronic device and/or user agent acts on the information about the user. Such acts include, but are not limited to, posting the information to the internet and/or a website, sharing the information with other users or other electronic devices or other user agents, electronically transmitting the information, storing the information in memory, deleting the information from memory, modifying the information, processing the information, emailing the information, texting the information, analyzing the information, and/or saving the information.

Consider an example in which a camera of a user captures a series of pictures of the user with his dog. The user previously indicated that pictures of the user and his dog have no privacy restrictions and are available to share with other users. A user agent of another user takes some pictures of the user with his dog and then sends these pictures to the user agent of the user. The user agent of the user analyzes the pictures, chooses a favorite or best picture, and posts this picture to a social network of the user with a caption as follows: "Me and my best friend." The user was not involved in the decision process of taking the pictures, choosing a picture, deciding to post the picture, composing the message, and posting the picture with a caption since the user agent acts on behalf of the user to conduct these acts.

Consider another example in which a user agent of a user queries user agents of friends of the user. For instance, the user agent of the user asks the other user agents if they know the location of the user. A user agent of a friend of the user determines that the user and the friend are in a business meeting at a hotel and provides this information to the user agent of the user. The user agent of the user verifies that this information is authorized to be public. Based on this information, the user agent of the user updates a status of the user on a website (such as posting "in a meeting" on a website of the user that provides updates about business activities and current locations of the user).

A user, an electronic device of the user, user, and/or a user agent of the user can determine authorization settings for information, such as determining what information is private and/or restricted. For example, information deemed private is not disseminated or disclosed to anyone, disseminated or disclosed to selected individuals, not disseminated or disclosed to the public, etc.

Consider an example in which a machine learning user agent observes restrictions on information that a user places over a period of time. Based on these observations, the user agent develops and creates authorization settings for new pieces of information for which the user has not yet designated an authorization setting.

FIG. 12 is an electronic device 1200 with a display 1210 that shows examples of some common interest settings 1220. Checking or marking a box indicates an interest and/or information that will be exchanged, compared, and/or searched with other users, other electronic devices, and/or other user agents.

Consider an example in which the desired interests are occupation of "doctor" and gender of "male." During a subsequent search and/or communication with another electronic device, a common interest match can occur when the discovered individual has an occupation of a doctor and/or his gender is a male.

FIG. 13 is an electronic device 1300 with a display 1310 that shows examples of some privacy and/or authorization settings 1320. Checking or marking a box activates or enables a privacy setting.

Consider an example in which the privacy settings of location and phone number are selected to "never." During a subsequent search and/or communication with another electronic device, these activated privacy settings are applied such that the location and phone number of the user are not provided.

Determinations by the electronic device and/or the user agent can be modeled as a prediction that the user with take an action. For example, an analysis of historic events, personal information, geographic location, and/or the user profile provides a probability and/or likelihood that the user will take an action (such as determining which fields and/or entries to populate, selecting which data to populate a field and/or entry, determining which alternative data to present to a user, determining which personal information to exchange with another electronic device and/or user agent, determining common interests between a user and another individual, selecting individuals with whom to communicate, determining authorization and/or privacy settings, determining what information to disseminate on behalf of a user, determining how to execute blocks in methods discussed herein). By way of example, one or more predictive models are used to predict the probability that a user would take, determine, or desire the action. The predictive models can use one or more classifiers to determine this probability. Example models and/or classifiers include, but are not limited to, a Naive Bayes classifier (including classifiers that apply Bayes' theorem), k-nearest neighbor algorithm (k-NN, including classifying objects based on a closeness to training examples in feature space), statistics (including the collection, organization, and analysis of data), support vector machine (SVM, including supervised learning models that analyze data and recognize patterns in data), data mining (including discovery of patterns in datasets), artificial intelligence (including systems that use intelligent agents to perceive environments and take action based on the perceptions), machine learning (including systems that learn from data), pattern recognition (including classification, regression, sequence labeling, speech tagging, and parsing), knowledge discovery (including the creation and analysis of data from databases and unstructured data sources), logistic regression (including generation of predictions using continuous and/or discrete variables), group method of data handling (GMDH, including inductive algorithms that model multi-parameter data) and uplift modeling (including analyzing and modeling changes in probability due to an action, such as an action on a consumer).

Figure 14:
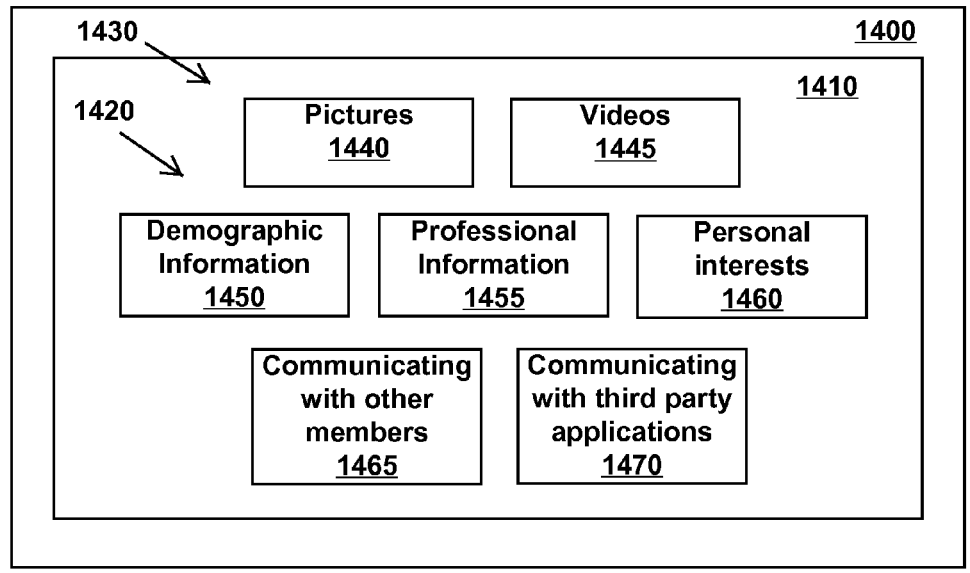
FIG. 14 is an electronic device with a display that shows fields and/or entries of a social networking webpage in accordance with an example embodiment.

FIG. 14 is an electronic device 1400 with a display 1410 that shows fields and/or entries 1420 of a social networking webpage 1430. The social networking webpage 1430 can include a variety of different fields and/or entries, such as those discussed in connection with FIGS. 2, 3, and 4. Further, such fields and/or entries can simultaneously appear on a single webpage, appear on multiple webpages, or not appear on a webpage. For illustration, social networking webpage 1430 includes fields and/or entries of pictures 1440 (such as pictures of the user, user's family, user's friends, etc.), videos 1445 (such as videos of the user, user's family, user's friends, etc.), demographic information 1450 about the user, professional information 1455 about the user, personal interests 1460 of the user, communicating with other members of the social network 1465 (such as texting, chatting, calling, etc.), and communicating with third party applications 1470.

Figure 15:
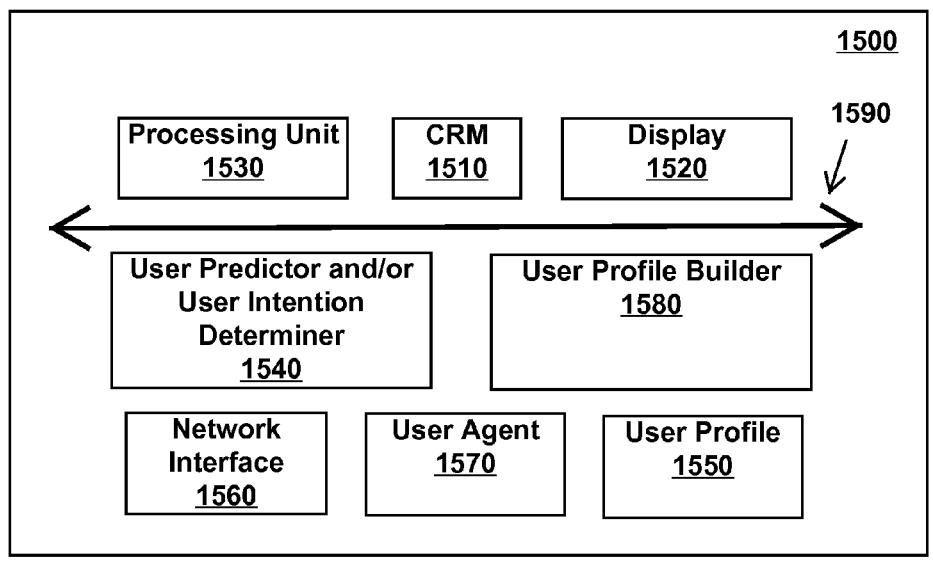
FIG. 15 is an electronic device in accordance with an example embodiment.

FIG. 15 is an electronic device 1500 in accordance with an example embodiment. The electronic device includes components of computer readable medium (CRM) or memory 1510, a display 1520, a processing unit 1530, a user predictor and/or user intention determiner 1540, a user profile 1550, a network interface 1560, a user agent 1570, a user profile builder 1580, and one or more buses or communication paths 1590. FIG. 15 shows these components in a single electronic device. Alternatively, one or more of these components can be distributed or included in various electronic devices, such as some components being included in an HPED, some components being included in a server, some components being included in storage accessible over the Internet, components being in various different electronic devices that are spread across a network, etc.

The processor unit 1530 includes a processor (such as a central processing unit, CPU, microprocessor, application-specific integrated circuit (ASIC), etc.) for controlling the overall operation of memory 1510 (such as random access memory (RAM) for temporary data storage, read only memory (ROM) for permanent data storage, and firmware). The processing unit 1530 communicates with memory 1510 and performs operations and tasks that implement one or more blocks of the flow diagrams discussed herein. The memory 1510, for example, stores applications, data, programs, algorithms (including software to implement or assist in implementing example embodiments) and other data.

The network interface 1560 provides a mechanism for the electrical device 1500 to communicate with other electrical devices, computers, or systems. For example, the network interface 1560 enables the electrical device to transmit data through a wired or wireless connection to a network, such as the Internet and/or a cellular network.

Blocks and/or methods discussed herein can be performed by computers, computer systems, electronic devices, and/or user agents without knowledge of the user and/or without instruction from the user. Examples are provided herein. Consider an additional example in which a user is without knowledge of when an action occurs but has provided instruction for the action. For instance, a user instructs his user agent to find another user with a special professional background and expertise and then to send a friend request to this individual when the individual is located. One day later, while the user is asleep, the user agent locates the individual and sends the friend request. The user did not have specific knowledge of the user agent locating the individual and sending the request but had previously provided instruction to the user agent to perform these specific tasks. Consider an example in which the user has knowledge of an action but did not instruct the action. For instance, a third party (not the user) instructs an HPED of the user to turn on a camera of the HPED and take a picture. Right before the HPED turns on the camera to take a picture, the HPED displays a message as follows: "I am turning on the camera to take a picture." The user views this message and has knowledge of the action of the HPED taking a picture, but did not provide the HPED with the instruction to perform the action. Consider an example in which a user agent of a user performs an action without the user having knowledge of the action and without the user providing the user agent with instruction to perform the action. For instance, a tablet computer of a user has a privacy setting indicating that the tablet computer can post a geographical location of the user to a social networking webpage of the user. While the user is having dinner at the Eiffel Tower, the tablet computer determines the location of the user, the activity of the user, and posts the following message: "Sitting on top of the world at the Eiffel Tower enjoying dinner." The user is not aware that the tablet computer made this post and did not explicitly instruct the tablet computer to make the post.

As used herein, a "common interest" is an interest, feature, activity, and/or attribute that is shared by and/or belongs to two or more people or entities.

As used herein, "create" means to produce, to be the cause of, or to bring about by a course of action.

As used herein, a "field" is an area and/or space into which a type of information is stored and/or recorded. By way of example, a field is a record in a database (such as in a relational database), a data variable that is encapsulated in a class or object (such as in object-oriented programming), or a space that depicts a photograph (such as a photo field on a social networking website). For instance, a field could be a "username" field that holds the username for a user. Alternatively, a field could be a location on a website that portrays a photograph of a user.

As used herein, "gather" means to collect and/or assemble.

As used herein, the term "information" includes communication and/or reception of knowledge and/or intelligence, and knowledge obtained from investigation, study, and/or instruction. Information also includes data, such as information in numerical form that can be digitally transmitted and/or processed. Thus, information includes raw data and unorganized facts that can be processed, and also includes processed, organized, and structured, such as data being processed and presented in a useful context.

As used herein, a "social network" is a social structure in which users communicate with each other over a network with electronic devices. The social network facilitates the building of social relations among users who share backgrounds, familial relations, business relations, interests, and/or connections. The social network includes one or more of representations and/or information about the users (such as user profiles, photos, videos, etc.) and a platform (such as a web-based platform) that allows the users to communicate with each other over one or more network (such as using email and/or instant messages over the Internet) and/or share information with other users in the social network.

As used herein, a "user" is a human being, a person.

As used herein, a "user agent" is software that acts on behalf of a user. User agents include, but are not limited to, one or more of intelligent agents (agents that use learning, reasoning and/or artificial intelligence), multi-agent systems (plural agents that communicate with each other), mobile agents (agents that move execution to different processors), autonomous agents (agents that modify processes to achieve an objective), and distributed agents (agents that execute on physically distinct electronic devices).

As used herein, a "user profile" is personal data that represents an identity of a specific person or organization. The user profile includes information pertaining to the characteristics and/or preferences of the user. Examples of this information for a person include, but are not limited to, one or more of personal data of the user (such as age, gender, race, ethnicity, religion, hobbies, interests, income, employment, education, etc.), photographs (such as photos of the user, family, friends, and/or colleagues), videos (such as videos of the user, family, friends, and/or colleagues), and user-specific data that defines the user's interaction with and/or content on an electronic device (such as display settings, application settings, network settings, stored files, downloads/uploads, browser activity, software applications, user interface or GUI activities, and/or privileges).

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method executed by a computer system, comprising: selecting, by a first user agent included in a first handheld portable electronic device (HPED) of a first user in the computer system and without knowledge of and instruction from the first user, a second HPED an electronic device of a second user having a second user agent included in the second HPED of the second user; exchanging, between the first user agent in the first HPED and the second user agent in the second HPED in the computer system and without knowledge of and instruction from the first user, personal information about the first user and personal information about the second user; determining, by the first user agent in the first HPED in the computer system and without knowledge of and instruction from the first user, whether a common interest exists between the first user and the second user based on the personal information about the first user and the personal information about the second user; and adding, by the first user agent in the first HPED in the computer system and without knowledge of and instruction from the first user, the second user to a social networking webpage of the first user based on the determining by the first user agent in the first HPED that the common interest exists, wherein the first user agent and the second user agent are intelligent user agents that analyze the personal information to make an intelligent prediction about whether the common interest exists, wherein the first HPED of the first user is pointed at the second user in order to select the second user with the first HPED of the first user.

2. The method of claim 1 further comprising: building by the first user agent, on behalf of the first user, the social networking webpage of the first user by the first user agent creating a new user account for the first user at the social networking webpage, deciding which pictures of the first user to upload to the social networking webpage, establishing a username and password for the first user to log into the social networking webpage, and sending friend requests on behalf of the first user.

3. The method of claim 1 further comprising:
activating, by the first user agent and without knowledge of and instruction from the first user, a camera on a handheld portable electronic device to take a photograph of the first user;
uploading, by the first user agent and without knowledge of and instruction from the first user, the photograph to the social networking webpage of the first user.

4. The method of claim 1 further comprising:
determining, by the first user agent and without knowledge of and instruction from the first user, a mood of the first user and an action of the first user;
composing, by the first user agent and without knowledge of and instruction from the first user, a post that describes the mood of the first user and the action of the first user;
posting, by the first user agent and without knowledge of and instruction from the first user, the post to the social networking webpage of the first user.

5. The method of claim 1 further comprising:
determining, by the first user agent, alternative information to populate a field in the social networking webpage of the first user;
displaying, to the first user, simultaneously a plurality of the fields that are populated with the alternative information, wherein the plurality of fields are displayed with a hierarchical format in which a first choice alternative is located above a second choice alternative.

6. The method of claim 1 further comprising:
searching, by the first user agent and without knowledge of and instruction from the first user, other electronic devices that are within visual proximity of the first user;
exchanging the personal information about the first user with user agents of the other electronic devices when the other electronic devices are within the visual proximity.

7. The method of claim 1 further comprising:
informing the first user that the second user was added to the social networking webpage of the first user after the second user is already added to the social networking webpage of the first user.

8. A computer system, comprising: one or more memories that store instructions; and a processing unit that executes the instructions to: select, with a handheld portable electronic device (HPED) of a user, an individual having an HPED and being away from but within proximity of the user; exchange, between the HPED of the user and the HPED of the individual, personal information about the user and personal information about the individual; determine, by the HPED of the user and by the HPED of the individual, whether the user and the individual have a common interest; notify, on the HPED of the user, the user that the common interest exists between the user and the individual; provide the user with information to locate the individual and to identify the individual after the individual agrees to provide the information to locate and to identify the individual; and provide the individual with information to locate the user and to identify the user after the user agrees to provide the information to locate and to identify the user, wherein the HPED of the user and the HPED of the individual include machine-learning agents that learn from data to predict that the common interest exists between the user and the individual, wherein the HPED of the user is pointed at the individual in order to select the individual with the HPED of the user, and wherein the user and the individual are different people.

9. The computer system of claim 8, wherein the processing unit further executes the instructions to:
take, with the HPED of the user, a photograph of the individual that is within visual proximity of the user;
analyze a face of the individual to determine an identity of the individual; and
determine contact information for the HPED of the individual based on the identity determined from analyzing the face of the individual.

10. The computer system of claim 8, wherein the information to locate the user and to identify the user are not disclosed to the individual until the user authorizes disclosing the information to locate the user and to identify the user, and the information to locate the individual and to identify the individual are not disclosed to the user until the individual authorizes disclosing the information to locate the individual and to identify the individual.

11. The computer system of claim 8, wherein the information to locate the user and to identify the user are displayed on the HPED of the individual and includes a description of a physical location of the user and a photograph of the user, and the information to locate the individual and to identify the individual are displayed on the HPED of the user and includes a description of a physical location of the individual and a photograph of the individual.

12. The computer system of claim 8, wherein the HPED of the user selects the individual by taking a photograph of the individual and receiving a tap on a display of the HPED to indicate a location of the individual in the photograph.

13. A non-transitory computer readable storage medium storing instructions that cause a computer system to execute a method, comprising: select, by a first user agent in a first handheld portable electronic device (HPED) of a first user, a second user having a second user agent in a second HPED of the second user; exchange, between the first user agent in the first HPED and the second user agent in the second HPED, personal information about the first user and personal information about the second user; determine, by the first user agent in the first HPED, whether a common interest exists between the first user and the second user based on the exchange of the personal information about the first user and the exchange of the personal information about the second user; and add the second user to a social networking webpage of the first user based on the determining by the first user agent in the first HPED that the common interest exists, wherein the first user agent and the second user agent are intelligent user agents that utilize a predictive model to determine whether the common interest exists between the first user and the second user, the method further comprising: taking, by the first user agent and without knowledge of and instruction from the first user, a picture of the first user; and
posting, by the first user agent and without knowledge of and instruction from the first user, the picture of the first user to the social networking webpage since the first user trusts a judgment of the first user agent to post pictures to the social networking webpage on behalf of the first user.

14. The non-transitory computer readable storage medium storing instructions of claim 13 further to cause the computer system to execute the method comprising:
create, by the first user agent, information about the first user by activating a camera on a portable electronic device, instructing the camera to take a photograph of the first user, and posting the photograph to the social networking webpage of the first user, wherein activating the camera by the first user agent, instructing the camera by the first user agent, and posting the photograph by the first user agent occur without knowledge of the first user and without instruction from the first user.

15. The non-transitory computer readable storage medium storing instructions of claim 13 further to cause the computer system to execute the method comprising:
create, by the first user agent, an event for the first user by contacting a family member of the first user, communicating with the family member, and scheduling an appointment for the first user to meet the family member, wherein contacting the family member by the first user agent, communicating with the family member by the first user agent, and scheduling the appointment by the first user agent occur without knowledge of the first user and without instruction from the first user.

16. The non-transitory computer readable storage medium storing instructions of claim 13 further to cause the computer system to execute the method comprising:
post, by the first user agent and at the social networking webpage, information of a geographical location of the first user and an activity of the first user at the geographical location without instruction from the first user to post the information and without knowledge of the first user of the information being posted.

17. The non-transitory computer readable storage medium storing instructions of claim 13 further to cause the computer system to execute the method comprising:
pre-approve the first user agent to build the social networking webpage for the first user before the first user agent commences to build the social networking webpage.

18. The non-transitory computer readable storage medium storing instructions of claim 13 further to cause the computer system to execute the method comprising:
authorize the first user agent to register the first user as a new member of the social networking webpage and build the social networking webpage by selecting a favorite photograph of the first user from a plurality of photographs of the first user, uploading the favorite photograph to the social networking webpage, and providing to the social networking webpage personal information about the first user regarding employment, education, and family information, wherein the first user agent decides, without input from the first user, which one of the plurality of photographs to be the favorite picture.

* * * * *